(12) United States Patent
Shawaf et al.

(10) Patent No.: US 11,440,701 B2
(45) Date of Patent: Sep. 13, 2022

(54) STRUCTURAL BLOCK ASSEMBLY

(71) Applicant: Paxxal Inc., Noblesville, IN (US)

(72) Inventors: Omar Shawaf, Riyadh (SA); Ezzeldin Elmassry, Noblesville, IN (US); Ben Stoller, Orlando, FL (US); Ellwood Phillip Hunt, III, Orlando, FL (US); Thomas Richard Hopson, III, Greenwood, IN (US)

(73) Assignee: Paxxal Inc., Noblesville, IN (US)

( * ) Notice: Subject to any disclaimer, the term of this patent is extended or adjusted under 35 U.S.C. 154(b) by 496 days.

(21) Appl. No.: 16/718,382

(22) Filed: Dec. 18, 2019

(65) Prior Publication Data

US 2020/0216219 A1 Jul. 9, 2020

Related U.S. Application Data

(63) Continuation-in-part of application No. 16/520,770, filed on Jul. 24, 2019, now abandoned.

(Continued)

(51) Int. Cl.
*B65D 19/38* (2006.01)
*B29C 65/18* (2006.01)
(Continued)

(52) U.S. Cl.
CPC .............. *B65D 19/38* (2013.01); *B29C 65/18* (2013.01); *B29C 66/41* (2013.01); *B29C 65/20* (2013.01);
(Continued)

(58) Field of Classification Search
CPC ......... B29C 65/18; B29C 65/20; B29C 65/58; B29C 65/72; B29C 66/1142;
(Continued)

(56) References Cited

U.S. PATENT DOCUMENTS 3,511,191 A 5/1970 Barry, Jr. et al.
3,664,271 A 5/1972 Wolder et al.
(Continued)

FOREIGN PATENT DOCUMENTS

EP 1 021 346 B1 7/2002
EP 1 744 966 B1 12/2008
(Continued)

OTHER PUBLICATIONS

European Search Report issued in related EP19188157.2 dated Nov. 5, 2019.
(Continued)

*Primary Examiner* — Philip C Tucker
*Assistant Examiner* — Brian R Slawski
(74) *Attorney, Agent, or Firm* — Woodard, Emhardt, Henry, Reeves & Wagner, LLP

(57) ABSTRACT

A block assembly for connecting a first section and a second section of a load bearing assembly includes a male fitting and a female fitting. The male fitting includes a male fitting body and a projection extending from the male fitting body. The female fitting includes a female fitting body and defines a fitting cavity extending within an interior of the female fitting body. The male fitting couples with the female fitting by inserting the male fitting body within the fitting cavity and moving the male fitting body toward a base of the female fitting. The projection on the male fitting interacts with an interlocking joint on the female fitting to resist detachment of the male fitting with respect to the female fitting.

20 Claims, 19 Drawing Sheets

Related U.S. Application Data

(60) Provisional application No. 62/703,129, filed on Jul. 25, 2018, provisional application No. 62/789,662, filed on Jan. 8, 2019.

(51) Int. Cl.
  *B29C 65/00* (2006.01)
  *B29C 65/20* (2006.01)
  *B29C 65/72* (2006.01)

(52) U.S. Cl.
  CPC ............ *B29C 65/72* (2013.01); *B29C 66/131* (2013.01); *B29C 66/532* (2013.01); *B29C 66/73921* (2013.01); *B65D 2519/008* (2013.01); *B65D 2519/00104* (2013.01); *B65D 2519/00278* (2013.01); *B65D 2519/00333* (2013.01); *B65D 2519/00378* (2013.01)

(58) Field of Classification Search
  CPC ..... B29C 66/131; B29C 66/322; B29C 66/41; B29C 66/532; B29C 66/543; B29C 66/73921; B29L 2031/7178; B65D 19/0016; B65D 19/38; B65D 2519/00034; B65D 2519/00069; B65D 2519/00104; B65D 2519/00273; B65D 2519/00278; B65D 2519/00288; B65D 2519/00318; B65D 2519/00333; B65D 2519/00378; B65D 2519/00562; B65D 2519/00567; B65D 2519/00791; B65D 2519/00796; B65D 2519/008
  USPC ............ 156/60, 91, 92, 242, 245, 292, 297, 156/308.2, 309.6, 309.9, 322; 108/57.25, 108/57.26, 901, 902, 56.3
  See application file for complete search history.

(56) References Cited

U.S. PATENT DOCUMENTS

| | | |
|---|---|---|
| 3,691,964 A | 9/1972 | Larson et al. |
| 3,719,157 A | 3/1973 | Arcocha et al. |
| 3,880,092 A | 4/1975 | Seeber et al. |
| 3,915,099 A | 10/1975 | Wies et al. |
| 4,051,787 A | 10/1977 | Nishitani et al. |
| 5,186,338 A | 2/1993 | Boutet |
| 5,193,464 A | 3/1993 | Morden |
| 5,197,395 A | 3/1993 | Pigott et al. |
| 5,460,292 A | 10/1995 | Holman |
| 5,492,069 A | 2/1996 | Alexander et al. |
| D379,021 S | 4/1997 | Wies |
| 5,666,886 A | 9/1997 | Alexander et al. |
| 5,687,652 A | 11/1997 | Ruma |
| 6,053,466 A | 4/2000 | Jordan et al. |
| 6,109,190 A | 8/2000 | Hale et al. |
| 6,199,488 B1 | 3/2001 | Favaron et al. |
| 6,564,725 B2 | 5/2003 | Hale |
| 6,749,418 B2 | 6/2004 | Muirhead |
| 6,758,148 B2 | 7/2004 | Torrey et al. |
| 7,752,980 B2 | 7/2010 | Muirhead |
| 7,779,765 B2 | 8/2010 | Donnell et al. |
| 7,963,410 B2 | 6/2011 | Joergensen et al. |
| 8,006,629 B2 | 8/2011 | Naidu |
| 8,127,691 B2 | 3/2012 | Ingham |
| 8,596,207 B2 | 12/2013 | Dubois et al. |
| 8,596,459 B2 | 12/2013 | Huizingh et al. |
| 8,701,569 B2 | 4/2014 | Linares |
| 8,950,342 B2 | 2/2015 | Plattner |
| 8,955,709 B2 | 2/2015 | Lorenz et al. |
| 9,138,945 B2 | 9/2015 | Rimmer |
| 9,221,580 B2 | 12/2015 | Zelek et al. |
| 9,352,876 B2 | 5/2016 | Muirhead |
| 10,005,586 B1 | 6/2018 | Miller |
| 10,589,897 B1 | 3/2020 | Shawaf et al. |
| 2002/0112653 A1 | 8/2002 | Moore et al. |
| 2004/0159267 A1 | 8/2004 | Markling et al. |
| 2005/0145145 A1 | 7/2005 | Ogburn et al. |
| 2005/0193929 A1 | 9/2005 | Ingham |
| 2005/0237184 A1 | 10/2005 | Muirhead |
| 2006/0272556 A1 | 12/2006 | Apps |
| 2006/0278138 A1 | 12/2006 | Chi |
| 2007/0028814 A1 | 2/2007 | Swistak et al. |
| 2007/0234933 A1* | 10/2007 | Donnell ............ B65D 19/0016 108/56.3 |
| 2008/0122610 A1* | 5/2008 | Muirhead ............... H04W 4/02 340/505 |
| 2008/0210140 A1 | 9/2008 | Valentinsson |
| 2008/0236455 A1 | 10/2008 | Naidu |
| 2010/0043678 A1 | 2/2010 | Linares |
| 2010/0154685 A1 | 6/2010 | Arinstein |
| 2010/0206200 A1 | 8/2010 | Tosse |
| 2010/0288169 A1 | 11/2010 | Du Toit |
| 2011/0120353 A1 | 5/2011 | Jensen et al. |
| 2011/0179978 A1 | 7/2011 | Schmitt |
| 2011/0253016 A1 | 10/2011 | Leakey |
| 2012/0318692 A1 | 12/2012 | Kellerer |
| 2013/0032507 A1* | 2/2013 | Du Toit ............ B65D 19/0018 206/599 |
| 2013/0133557 A1 | 5/2013 | Yoshinaga |
| 2014/0137776 A1 | 5/2014 | Plattner |
| 2014/0158025 A1 | 6/2014 | Apps |
| 2015/0025190 A1 | 1/2015 | Grinsteinner et al. |
| 2016/0039566 A1 | 2/2016 | Lorenz |
| 2016/0368659 A1 | 12/2016 | Bastian, II et al. |
| 2018/0141708 A1 | 5/2018 | Storteboom et al. |
| 2018/0282017 A1 | 10/2018 | Bastian et al. |
| 2018/0339803 A1 | 11/2018 | Hawley et al. |
| 2019/0092521 A1 | 3/2019 | Zimmerman et al. |
| 2019/0359378 A1 | 11/2019 | White |
| 2019/0367212 A1 | 12/2019 | D'Emidio et al. |

FOREIGN PATENT DOCUMENTS

| | | |
|---|---|---|
| EP | 2 733 084 A1 | 5/2014 |
| JP | H06 1236 U | 1/1994 |
| JP | 2004131162 A | 4/2004 |
| WO | WO 2016/154260 A1 | 9/2016 |
| WO | WO 2018/051155 A1 | 3/2018 |

OTHER PUBLICATIONS

Machine translation of JP2004131162A by Patent Translate European Patent Office dated Nov. 15, 2019 (pp. 19).

\* cited by examiner

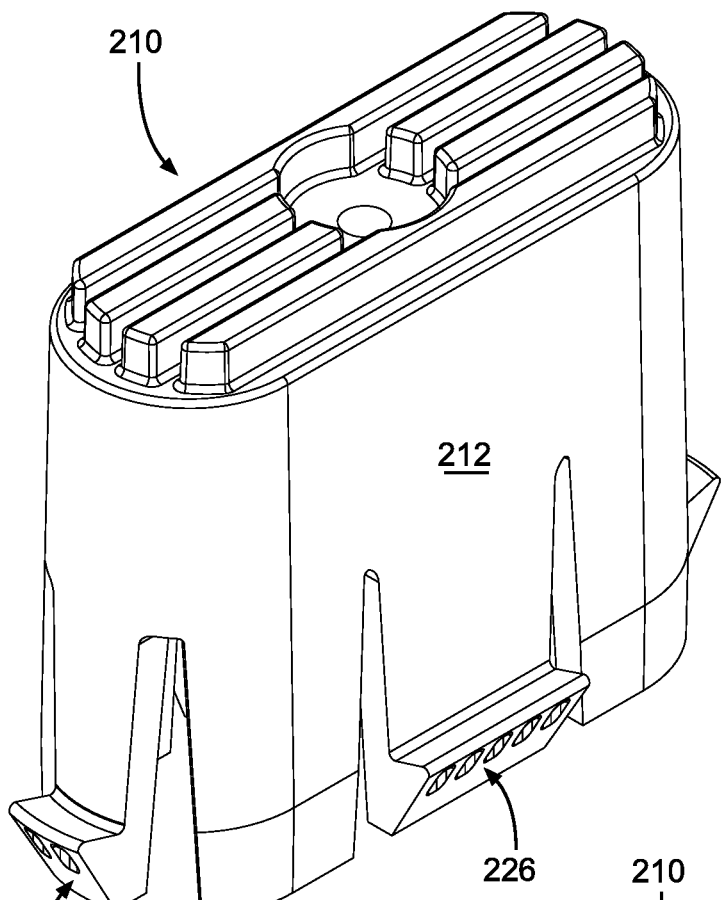
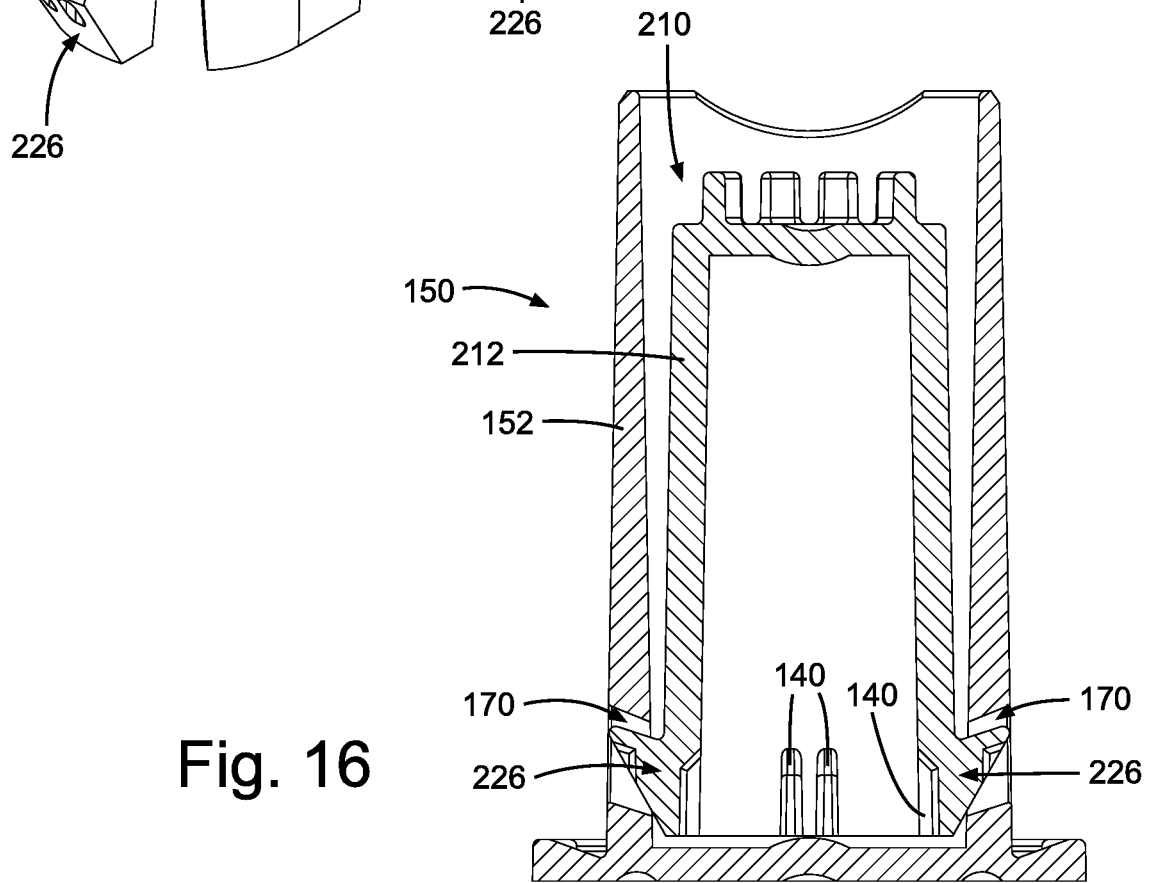

__STRUCTURAL BLOCK ASSEMBLY__

CROSS-REFERENCE TO RELATED APPLICATIONS

This application is a continuation-in-part of U.S. patent application Ser. No. 16/520,770 filed Jul. 24, 2019, which claims the benefit of U.S. Provisional Patent Application No. 62/703,129 filed Jul. 25, 2018 and U.S. Provisional Patent Application No. 62/789,662 filed Jan. 8, 2019, which are all hereby incorporated by reference.

BACKGROUND

This disclosure is in the field of plastic molded pallets.

Pallets are a commonly used structure that may support goods during transport while also allowing the goods to be lifted by a forklift, pallet jack, or other similar instrument. Pallets are commonly made from wood, but may also be made from other materials, such as plastic, metal, or concrete. In particular, plastic pallets may provide some advantages over other types of pallets. Plastic pallets are durable and have a long life span. They also may weigh less than a concrete or wooden pallet, reducing the cost of shipping. Additionally, plastic may be easier to clean or sterilize than a wooden or concrete pallet.

Because pallets are so widely used, they can represent a sizable expense in the shipping industry. Therefore it is beneficial to have a strong, durable pallet that is able to withstand the forces of the load that it is supporting as well as withstand forces from other objects such as a forklift or pallet jack without breaking.

BRIEF DESCRIPTION OF THE DRAWINGS

FIG. 15 is an alternative embodiment of a block assembly including no grooves adjacent projections.

FIG. 16 is a cross-sectional front view of the block assembly of FIG. 15.

DETAILED DESCRIPTION OF THE DRAWINGS

Figure 1A:
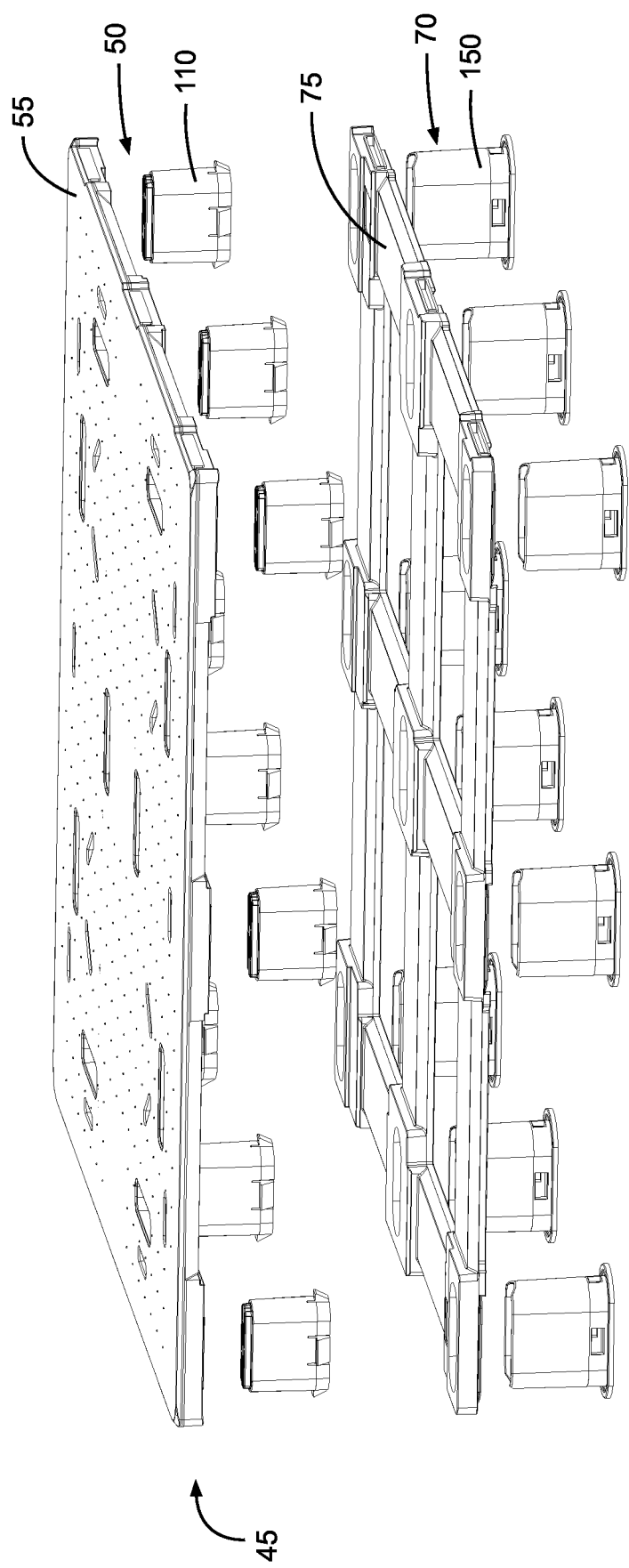
FIG. 1A is an exploded view of a pallet assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Figure 1B:
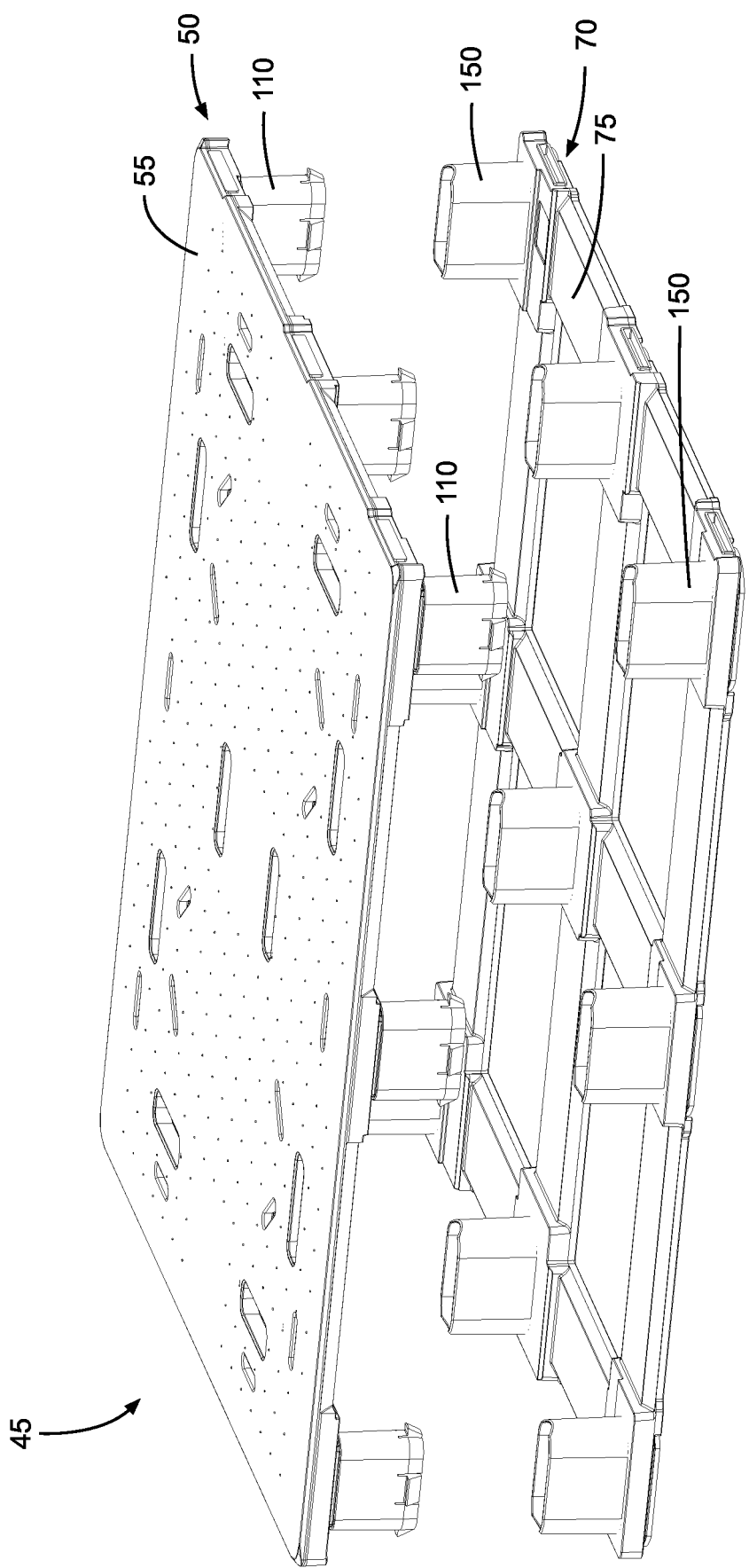
FIG. 1B is a partially exploded view of the pallet assembly of FIG. 1A

FIGS. 1A and 1B are exploded perspective views of a load bearing assembly 45. Load bearing assembly 45 is illustrated as a pallet assembly in FIGS. 1A and 1B; however, it should be recognized that in other embodiments, load bearing assembly 45 may be other structures other than a pallet that are capable of supporting a load. Load bearing assembly 45 includes a support assembly 50 and a base assembly 70. The support assembly 50 includes deck 55 and male fittings 110 that are attached to deck 55, for example by welding male fittings 110 to deck 55. The base assembly 70 includes a stringer 75 and female fittings 150 that extend through stringer 75. Female fittings 150 may be attached to stringer 75, for example by welding female fittings 150 to stringer 75.

Figure 2:
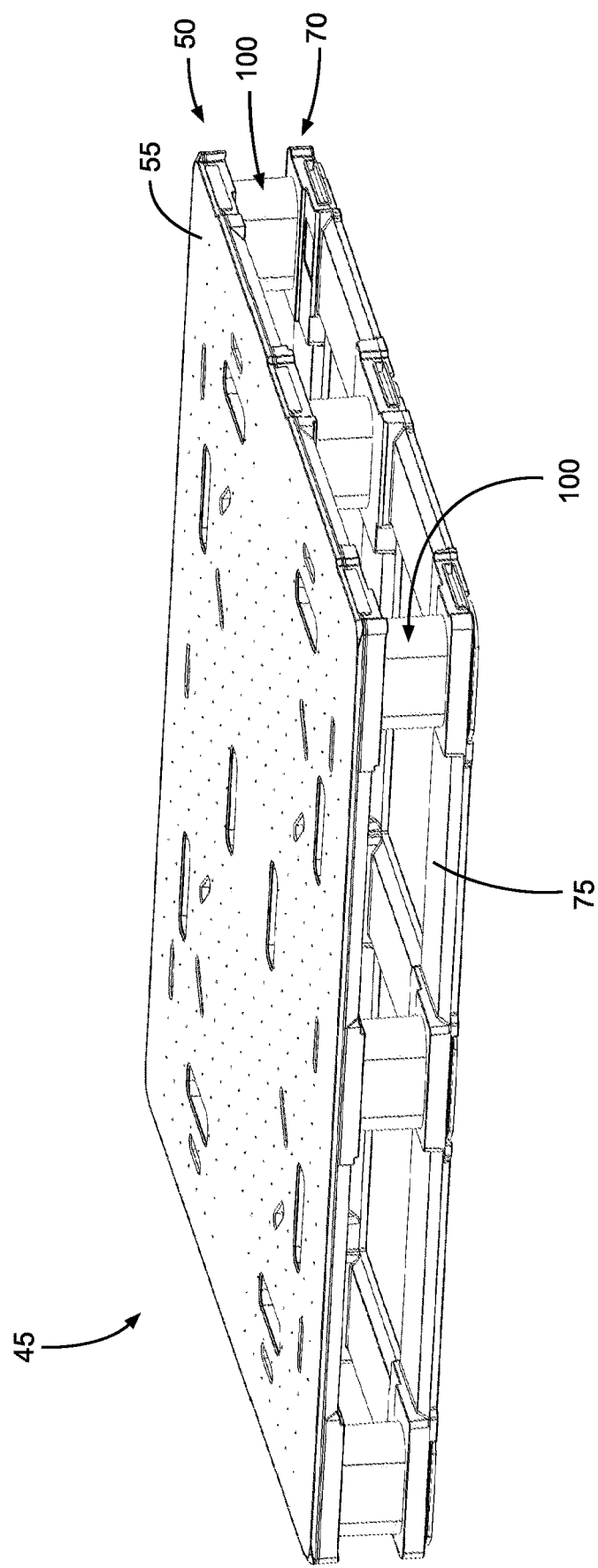
FIG. 2 is a perspective view of the pallet assembly of FIG. 1A

FIG. 2 is a perspective view of the assembled load bearing assembly 45. Deck 55 is positioned parallel to stringer 75 and each of the male fittings 110 is fit into a cavity of a corresponding female fitting 150 to form a block assembly 100. Each block assembly 100 extends between deck 55 and stringer 75 to connect deck 55 to stringer 75.

It should be understood that the pallet assembly is only used as a representative example and that block assembly 100 may be used in other applications to permanently or removably attach separate structures. For example, a block assembly 100 or multiple block assemblies 100 may be used with structures such as bins, containers, stands, tables, or any other suitable structure.

Figure 3:
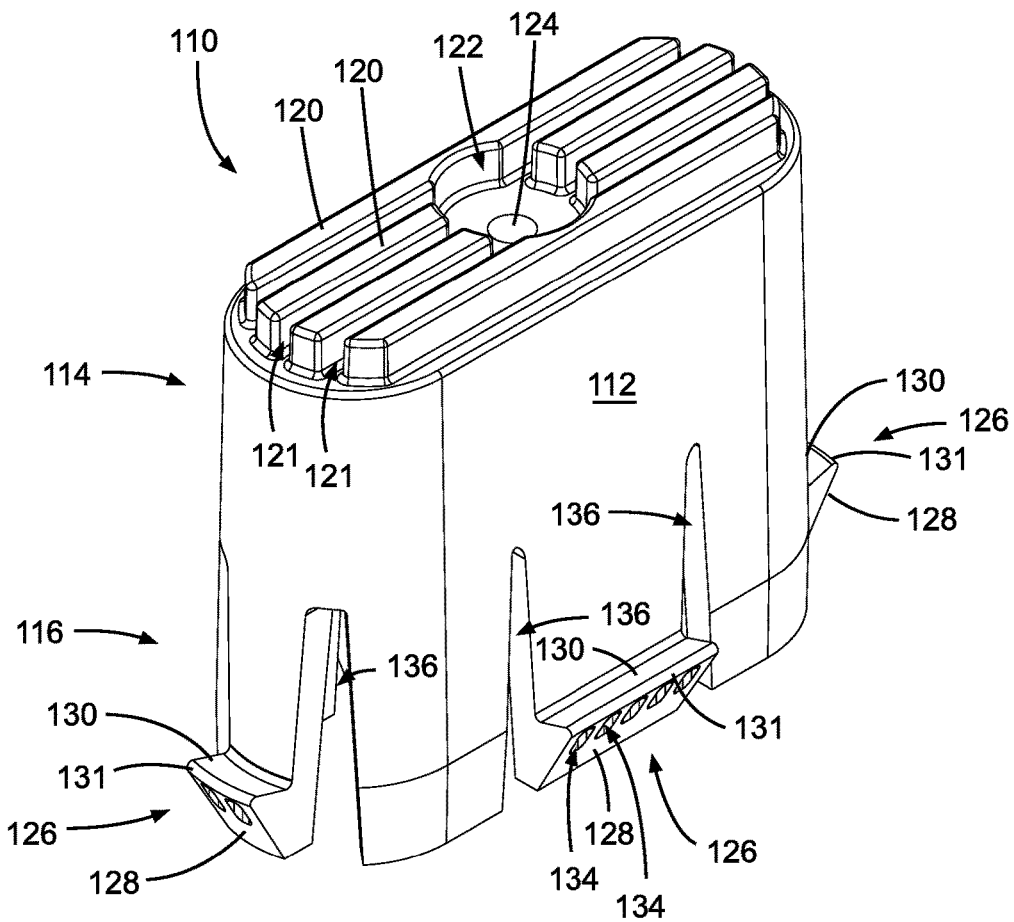
FIG. 3 is a perspective view of a male fitting of the pallet assembly of FIG. 1A.

A perspective view of male fitting 110 is illustrated in FIG. 3. Male fitting 110 includes a male fitting body 112 that defines a male fitting interior 115 (see FIG. 8). A set of male fitting flanges 120 are attached to a top portion 114 of male fitting body 112. A male fitting flange groove 121 is defined between each of the male fitting flanges 120. A flange opening 122 is defined through the male fitting flanges 120 and a hot tip recess for injection molding 124 is defined within the flange opening 122. A bottom portion 116 of male fitting body 112 includes projections 126, where one projection 126 extends from each side of male fitting body 112.

Figure 4:
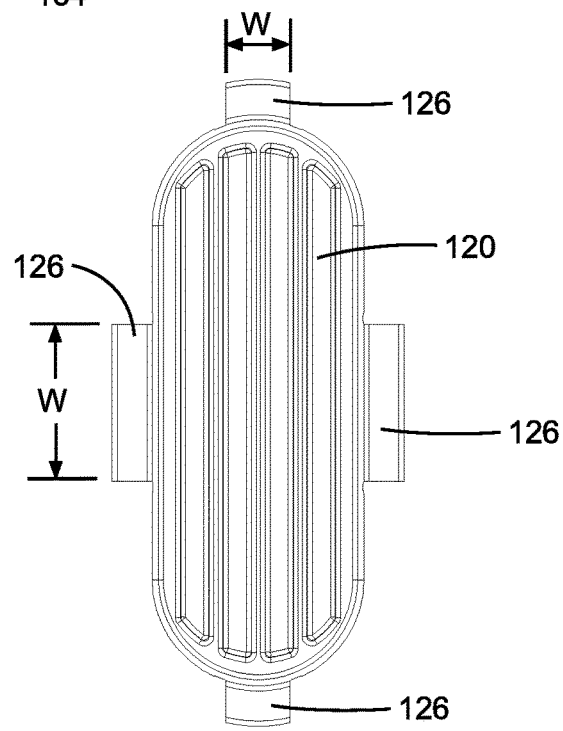
FIG. 4 is a top view of the male fitting of FIG. 3.

As shown the top view of male fitting 110 shown in FIG. 4, male fitting 110 has a male fitting body 112 with an oval-type shape with long straight sides and circular ends. The projections 126 on the longer sides of male fitting body 112 have a greater width, W, than the projections 126 on the shorter sides of male fitting body 112. In other embodiments, projections 126 may all be the same width. Additionally, in other embodiments, there may be a fewer number of projections 126 or a greater number of projections 126 as desired.

As illustrated in FIG. 3, each projection 126 includes an angled surface 128 that extends to a projection top surface 130. Angled surface 128 is connected to projection top surface 130 by a rounded projection edge 131. However, in other embodiments, projection edge 131 may not be rounded, but rather defined as a sharp corner. Exterior projection indents 134 are positioned on angled surface 128, and interior projection indents 140 are positioned on the projections 126 on the opposite side of male fitting body 112 as exterior projection indents 134 (see FIG. 8). The exterior projection indents 134 and the interior projection indents 140 can be used to increase the stiffness of projections 126. The indents 134, 140 may also reduce the amount of material needed for block assembly 100 and can decrease the weight of block assembly 100. As described below, modifying the size and the shape of the indents 134, 140 allows varying the properties of the projections 126.

A channel 136 is positioned on each side of projection 126. Channels 136 can allow projection 126 to flex independently of the rest of male fitting body 112 upon application of force to projection 126. Projection 126 may then snap back into its original position upon release of the force due to the resiliency of the material used to form projection 126. Each of the channels 136 may be the same size, or the length and width of the channels 136 may vary depending on the projection 126 to which the channel 136 is adjacent. For example, as shown in FIG. 3, the channels 136 adjacent to the projections 126 that have a smaller width, W, are wider than the channels 136 adjacent the projections 126 that have a larger width, W.

In other embodiments, the length and width of channels 136 may be increased or decreased as desired. For example, channel 136 may be designed with a larger length so that channel 136 extends further toward the top portion 114 of male fitting body 112. A longer channel length may allow projection 126 to be deflected using less force, but also makes the projection 126 weaker and easier to break. A shorter channel 136 can make projection 126 stronger and more resistant to breaking but requires more force to deflect projection 126. Adjusting the lengths of channels 136 may allow optimization of the male fitting 110 so that projection 126 has sufficient strength to not break when male fitting 110 is inserted into female fitting 150, but does not require so much force to make inserting male fitting 110 into female fitting 150 too difficult.

Figure 5:
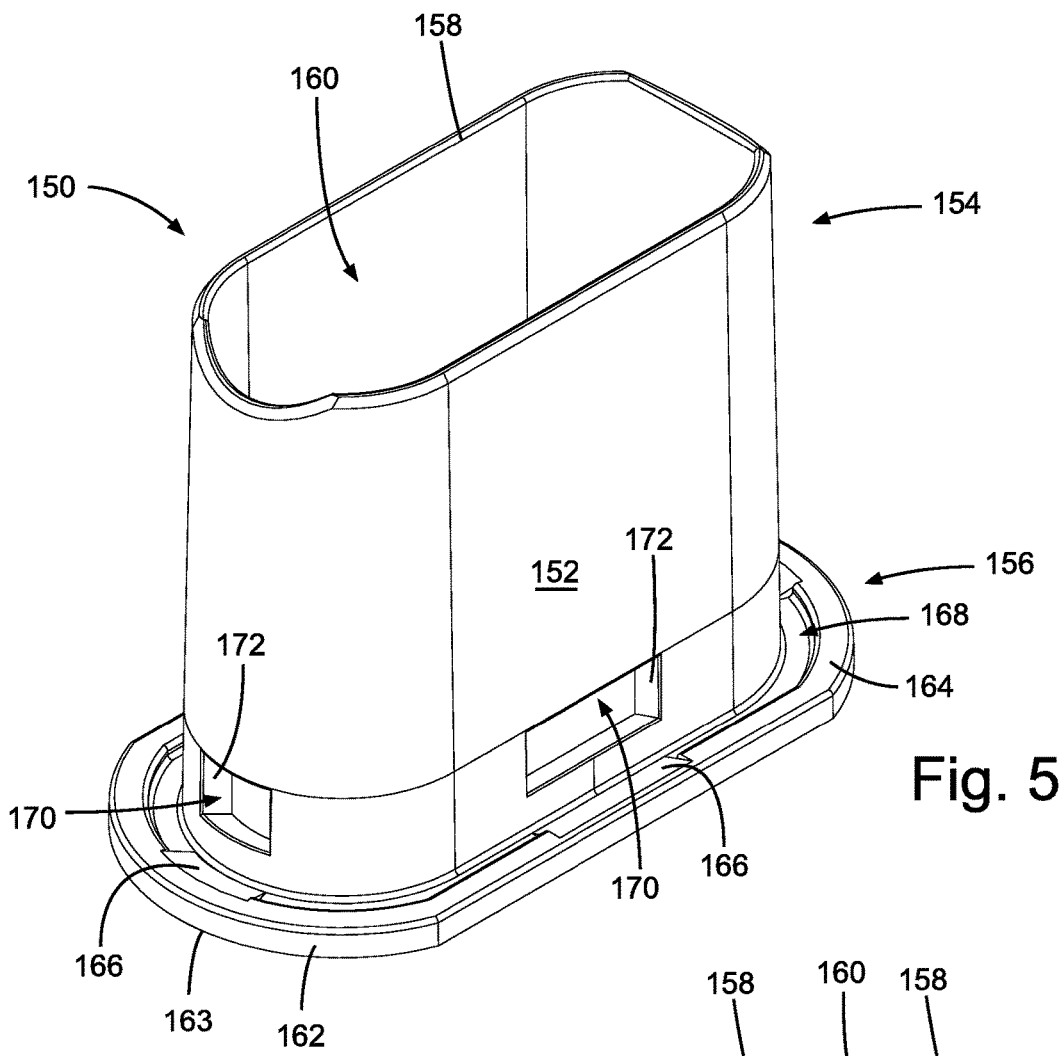
FIG. 5 is a perspective view of female fitting of the pallet assembly of FIG. 1A.

A perspective view of a female fitting 150 is shown in FIG. 5. Female fitting 150 includes a female fitting body 152 that has an upper portion 154 and a lower portion 156. The upper portion 154 of female fitting body 152 includes an upper lip 158 that defines a perimeter of the upper portion 154 of female fitting 150 and surrounds a fitting cavity 160 that extends through female fitting body 152. Fitting cavity 160 may be dimensioned so that a male fitting 110 can be fit within fitting cavity 160.

The lower portion 156 of female fitting 150 includes a fitting base 162 and a bottom surface 163. In some embodiments, drainage channels 176 are defined in the bottom surface 163 of fitting base 162 (see FIG. 8). These drainage channels 176 may prevent liquids from becoming trapped under the female fitting 150 when the female fitting is in contact with the ground or any other form of support surface.

Fitting base 162 includes a female fitting lip 164 and a base channel 168 surrounding female fitting lip 164. In some embodiments, ramped surfaces 166 may extend from female fitting lip 164 into base channel 168 as a relief for injection molding slides. These ramped surface 166 are designed to accommodate slides in an injection molding machine. Fitting base 162 has a greater width than female fitting body 152, so that a portion of fitting base 162 extends from female fitting body 152. This arrangement allows fitting base 162 to act as a wear surface. In some embodiments the bottom surface of the fitting base 162 may be made from a material that is more resistant to wear than the rest of the female fitting 150 and/or base assembly 70. In some embodiments, fitting base 162 can extend across the entirety of female fitting body 152 so that fitting cavity 160 is closed. However, in other embodiments, fitting cavity 160 may be defined through fitting base 162 so that fitting cavity 160 is open on both ends.

Figure 6:
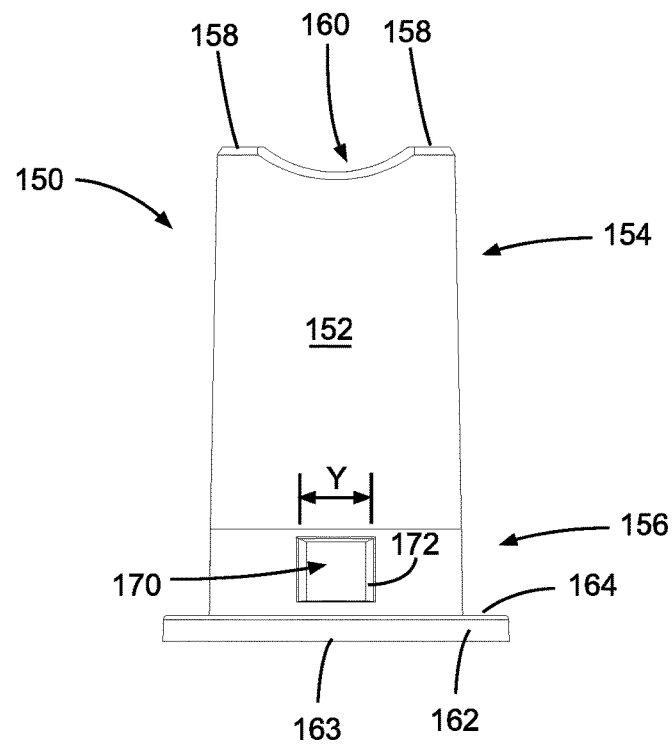
FIG. 6 is a front elevational view of the female fitting of FIG. 5.

An interlocking joint, such as a projection opening 170, is defined through each side of female fitting body 152. A projection opening inner surface 172 borders each side of projection opening 170. Projection openings 170 may be positioned on female fitting body 152 to align with the projections 126 of male fitting 110 when male fitting 110 is positioned within fitting cavity 160 of female fitting 150. To match male fitting 110, the embodiment of female fitting 150 shown in FIG. 5 has a female fitting body 152 with a race track type shape with long straight sides and circular ends. The projection openings 170 on the longer sides of female fitting body 152 may have a greater width, Y, (see FIG. 6) than the projection openings 170 on the shorter sides of female fitting body 152. In other embodiments, projection openings 170 may all be the same width. Additionally, in other embodiments, there may be a fewer number of projection openings 170 or a greater number of projection openings 170 as needed to correspond with the projections 126 of male fittings 110.

Figure 7:
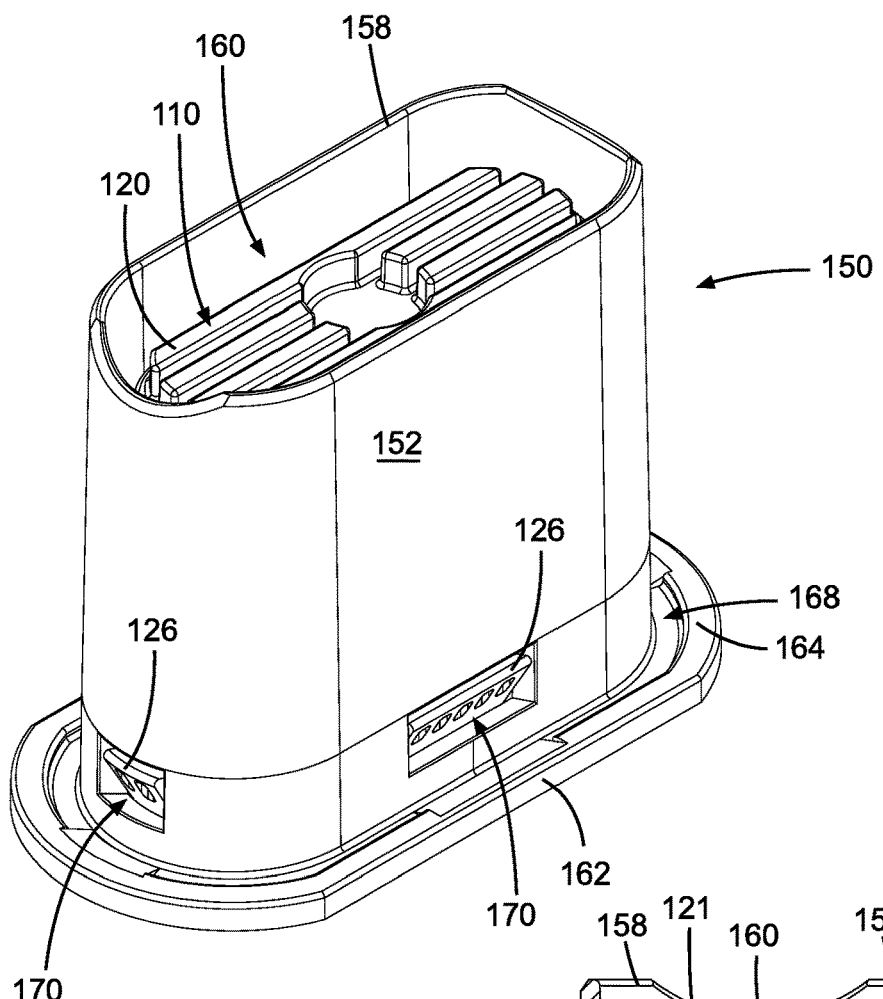
FIG. 7 is a perspective view of a block assembly of the pallet assembly of FIG. 1A.

A perspective view of a male fitting 110 fit within a corresponding female fitting 150 is shown in FIG. 7. The entirety of the male fitting body 112 can be inserted within fitting cavity 160 defined through female fitting body 152. As shown in the cross-sectional view illustrated in FIG. 8, as male fitting 110 is inserted through fitting cavity 160, projections 126 are flexed inward by female fitting body 152 of female fitting 150, allowing male fitting 110 to be moved toward fitting base 162. As male fitting 110 reaches fitting base 162, projections 126 align with projection openings 170 in female fitting 150. At this point, female fitting body 152 of female fitting 150 no longer applies force on projections 126, and projections 126 are allowed to flex outward, through a respective opening 170.

Projections 126 may interact with projection openings 170 to prevent male fitting 110 from inadvertently being removed from female fitting 150 once male fitting 110 has been inserted into fitting cavity 160. The projection top surface 130 of projection 126 may contact a projection opening top surface 174 of the projection opening inner surface 172, preventing male fitting 110 from being slid upward and out of female fitting 150. In order to remove male fitting 110, all of the projections 126 can be flexed inward to allow clearance between projection top surface 130 and top surface 174 of the projection opening inner surface 172.

As shown, the projection top surface 130 of projection 126 and the projection opening inner surface 172 may be arranged at an equivalent concave angle so that the projection top surface 130 and the projection opening top surface 174 are parallel to each other when male fitting 110 is secured within female fitting 150. It is not required that the projection top surface 130 and the projection opening inner surface are parallel. In other embodiments, the projection top surface 130 and the projection opening inner surface 172 may be arranged at different angles.

The concave angle of projection top surface 130 may increase the force needed to separate male fitting 110 from female fitting 150. Separation forces applied to pallet assembly tend to pull the projection 126 outward, away from fitting cavity 160, The upward slope of projection top surface 130 caused by the concave angle resists removal of projection 126 from projection opening 170.

Figure 9:
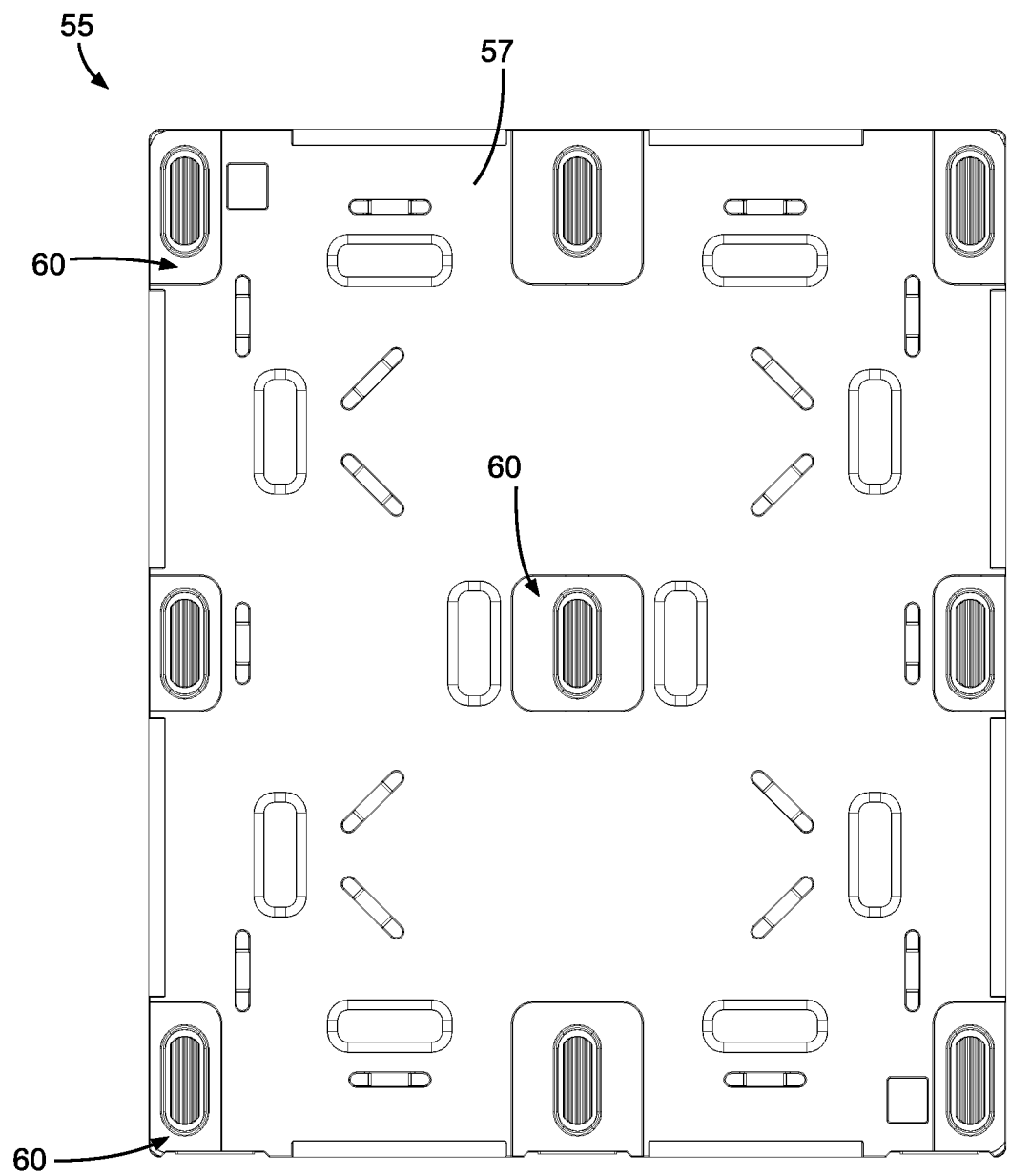
FIG. 9 is a bottom view of a deck of the pallet assembly of FIG. 1A.
Figure 10:
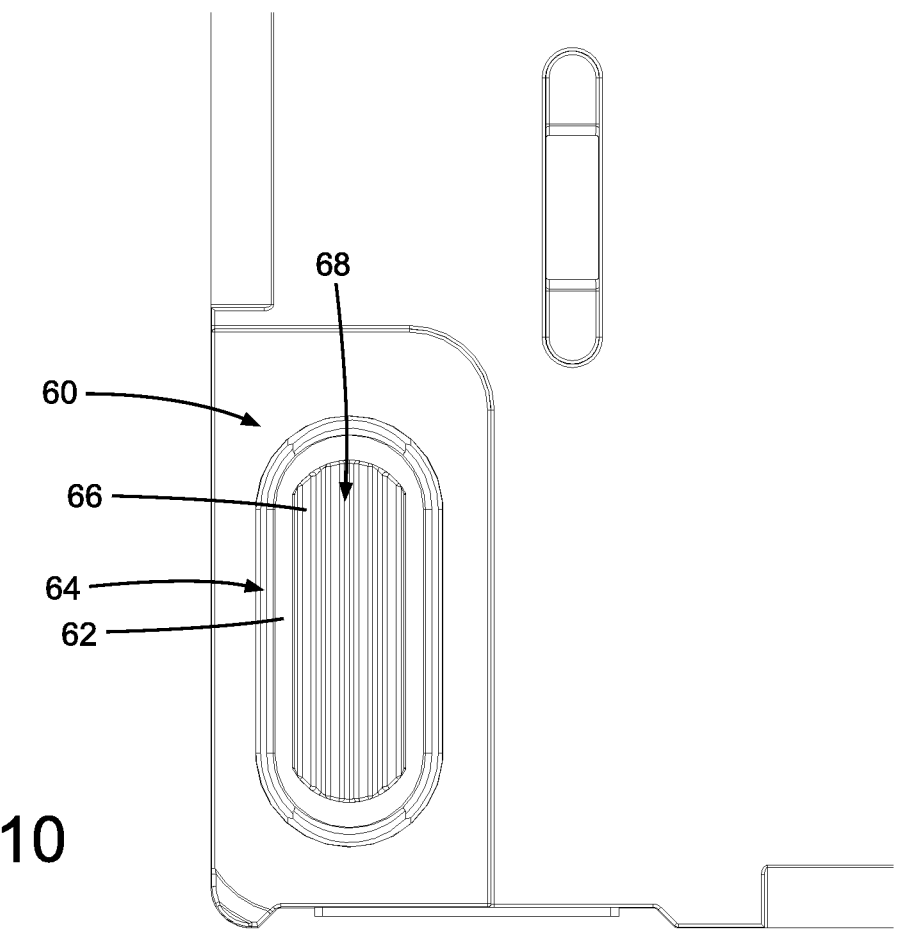
FIG. 10 is a zoomed bottom view of the deck of FIG. 9.

A bottom view of deck 55, illustrated in FIG. 9, shows a lower deck surface 58. The lower deck surface 58 includes fitting attachment sections 60 for attaching male fittings 110 to deck 55. Each fitting attachment section 60 includes a fitting attachment body portion 62 that is surrounded by a fitting attachment channel 64 (see FIG. 10). Fitting attachment channel 64 is positioned so that a portion of female fitting 150 may extend into fitting attachment channel 64 when support assembly 50 is coupled to base assembly 70. An arrangement of deck flanges 66 extend from fitting attachment body portion 62, forming deck grooves 68 between adjacent deck flanges 66.

Figure 11:
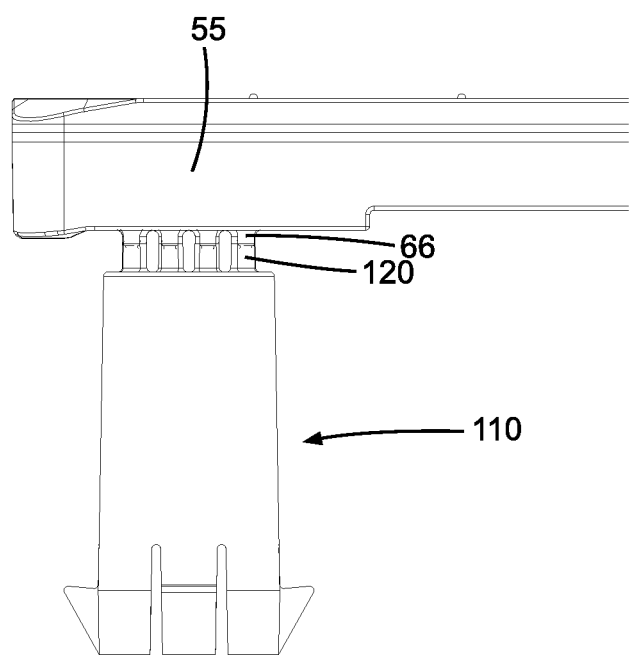
FIG. 11 is a zoomed front view of the male fitting of FIG. 3 attached to the deck of FIG. 9.

As shown in FIG. 11, male fitting 110 may be secured to deck 55 at a fitting attachment section 60. In one embodiment, male fitting 110 is attached to deck 55 by hot plate welding. When attaching male fitting 110, the male fitting flanges 120 are aligned with the deck flanges 66 so that male fitting flange groove 121 is also aligned with deck grooves 68. The alignment of male fitting flange grooves 121 and deck grooves 68 may allow for plastic to flow during the hot plate welding process.

Figure 12:
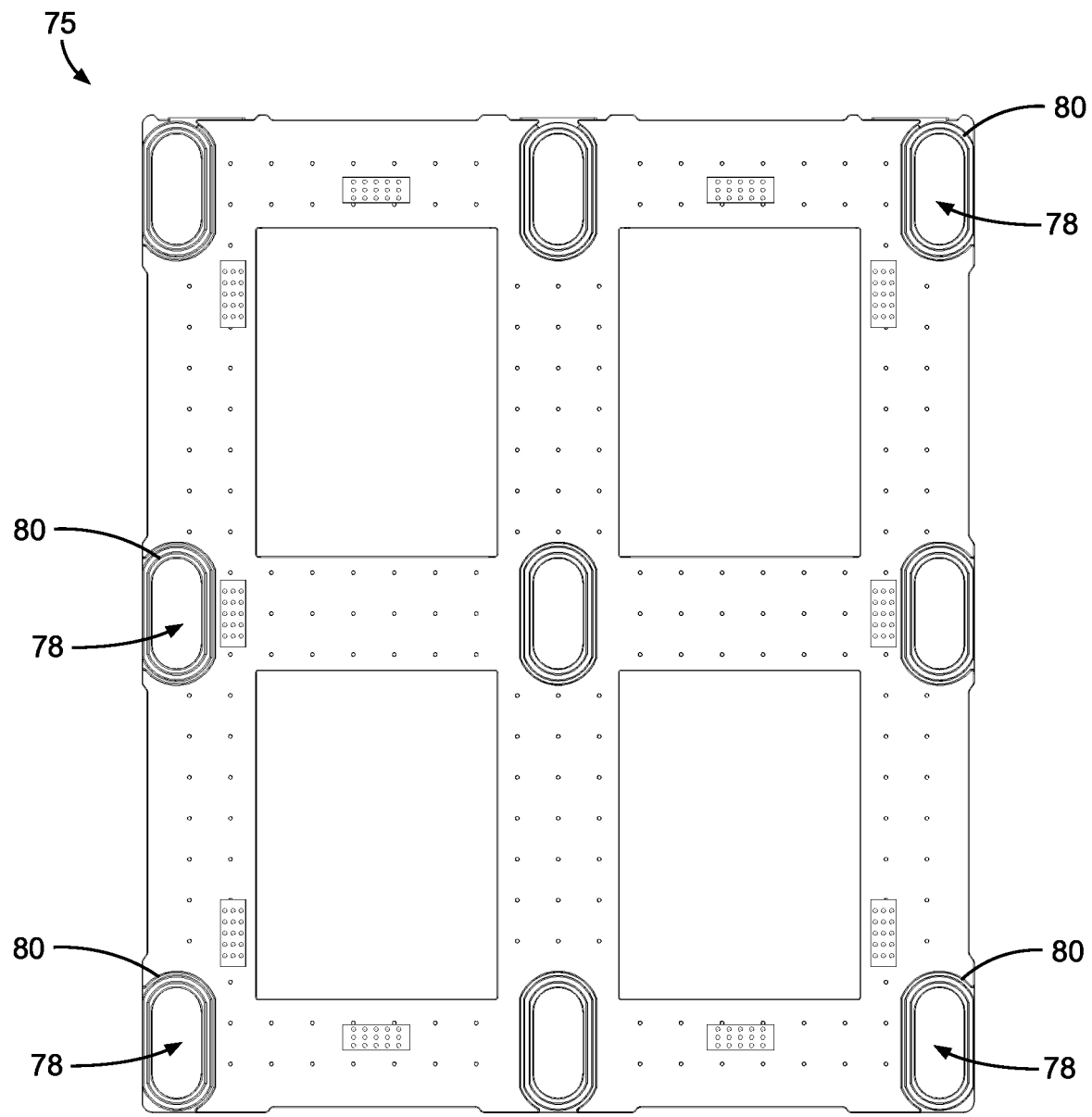
FIG. 12 is a bottom view of a stringer of the pallet assembly of FIG. 1A.
Figure 13:
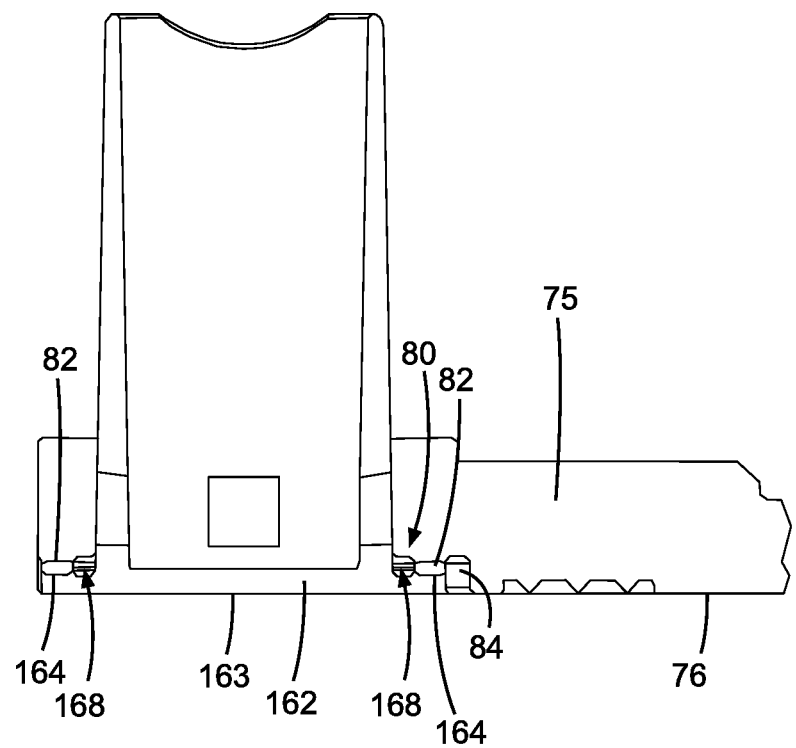
FIG. 13 is a zoomed cross-sectional front view of the female fitting of FIG. 5 attached to the stringer of FIG. 12.

Similar to male fitting 110, female fitting 150 may be attached to stringer 75 by welding. FIG. 12 illustrates a bottom view of stringer 75, and shows stringer openings 78 that extend completely through stringer 75. The position of stringer openings 78 may correspond to the position of the fitting attachment sections 60 in deck 55. Each of the stringer openings 78 are surrounded by a cavity 80. As shown in FIG. 13, cavity 80 interacts with the base of a female fitting 150 inserted through stringer opening 78 to secure female fitting 150 and to resist female fitting 150 from being inadvertently removed from stringer 75.

FIG. 13 shows a cross-sectional view of a portion of base assembly 70 to illustrate how female fitting 150 can be attached to stringer 75. As shown, female fitting 150 may extend completely through stringer opening 78 so that the bottom surface 163 of female fitting 150 is even with or slightly below a bottom surface 76 of stringer 75. Therefore, when load bearing assembly 45 is placed on the ground or another support surface, the bottom surfaces 163 of female fittings 150 are in contact with the ground or a support surface. This allows a load carried by support assembly 50 to be transferred directly from deck 55 through male fittings 110 and female fittings 150 and to the support surface rather than through compression of stringer 75, reducing the force placed on stringer 75.

Figure 14:
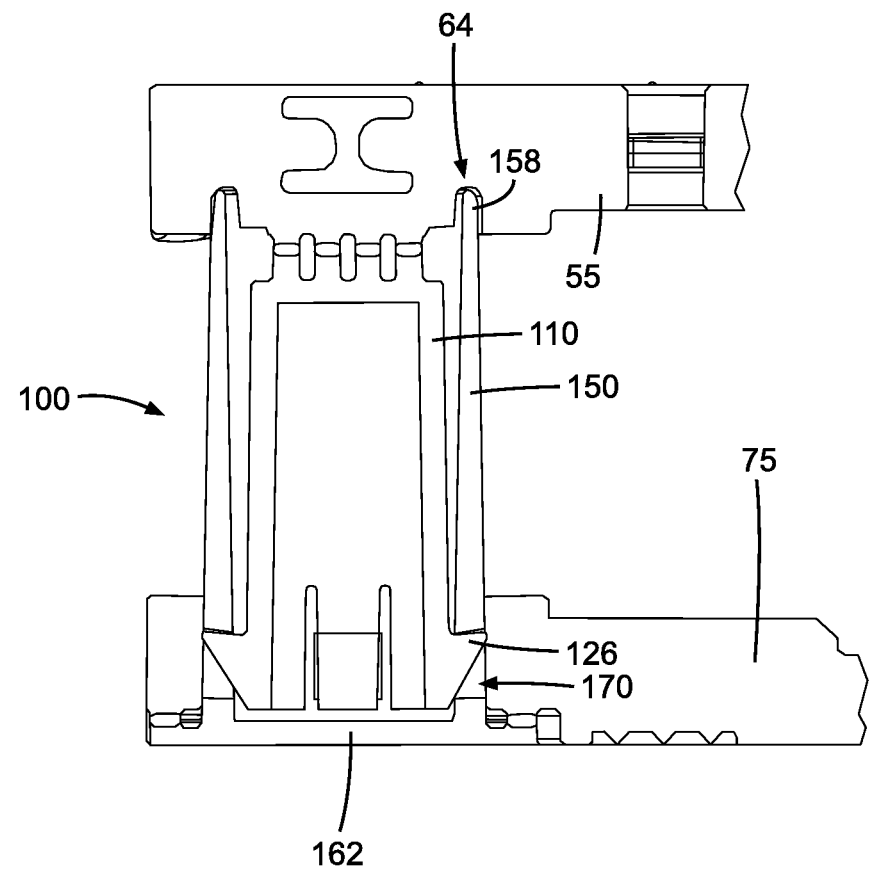
FIG. 14 is a zoomed cross-sectional front view of the block assembly of FIG. 7 attached to the deck of FIG. 9 and the stringer of FIG. 12.

A cross-sectional view of a block assembly 100 from an assembled load bearing assembly 45 is shown in FIG. 14. Male fitting 110 is attached to deck 55 and fit within the fitting cavity 160 of the female fitting 150 so that projections 126 extend through a respective projection opening 170. Female fitting 150 is inserted through a stringer opening 78 and extends from stringer 75 toward deck 55. The upper lip 158 of female fitting 150 is positioned within the fitting attachment channel 64 formed in the fitting attachment section 60 of deck 55. This arrangement allows for a more secure connection between support assembly 50 and base assembly 70 and provides greater strength to the block assembly 100 in the event that block assembly 100 is contacted by a fork of a forklift or any other force that may be applied to block assembly 100.

Female fitting 150 is positioned within stringer opening 78 so that female fitting lip 164 of fitting base 162 is aligned with a cavity lip 82 of cavity 80. Female fitting lip 164 of fitting base 162 is in contact with cavity lip 82 and may be welded or otherwise attached to cavity lip 82 so that female fitting 150 is permanently attached to stringer 75. Base channel 168 and a cavity channel 84 surround the connection between female fitting lip 164 and cavity lip 82, providing a channel for flow of plastic as the female fitting 150 is welded to stringer 75. In other embodiments, other methods of attachment may be used, such as the use of an adhesive or fastener to attach female fitting 150 to stringer 75.

The two part design of the block assembly 100 serves several functions. The block assembly 100 is formed with two layers, a female fitting 150 that acts as an outer layer, and a male fitting 110 that acts as the inner layer. A cavity is formed between the male fitting 110 and the female fitting 150 when the fittings are assembled together. Both the male fitting 110 and the female fitting 150 have a certain degree of flexibility, allowing block assembly 100 to absorb an impact before fracturing. If the block assembly 100 were instead formed from a single layer as thick as the combined layers, the material layers could be less flexible and might fracture on impact rather than deforming.

When force is applied to the block assembly 100, the female fitting 150 absorbs most of the impact of the force, until the female fitting 150 is deformed so that contact is made with the male fitting 110. Once contact is made with the male fitting 110, the male fitting 110 deforms along with the female fitting 150 to absorb any additional force.

In some embodiments, male fitting 110 and female fitting 150 may be made from different materials to optimize the durability of block assembly 100. As an example, female fitting 150 may be made from a resilient material that is able to absorb energy by deforming without breaking. This allows female fitting 150 to transfer at least a portion of the force to the male fitting 110, which may be made from a stiffer material that may be less susceptible to deformation.

Additionally, different block assemblies 100 on load bearing assembly 45 may be made from different materials. As an example, the block assemblies 100 on the outer perimeter of load bearing assembly 45 are more likely to sustain a direct impact than a block assembly on the interior of load bearing assembly 45. Therefore, the outside block assemblies 100 may can be made from a material that is resistant to abrasions and that can withstand direct forces. The block assemblies 100 within the interior of load bearing assembly 45 can be made from a material that is able to withstand compressive forces, as damage to the surface of these block assemblies are not as likely as damage to the surface of the block assemblies on the perimeter of load bearing assembly 45.

Although male fitting 110 may be attached to deck 55 and female fitting 150 may be attached to stringer 75 by any suitable attachment method, hot plate welding to attach these pieces provides several advantages. Hot plate welding of the female fitting 150 to the stringer 75 allows the creation of a fitting base 162 that is wider than the female fitting body 152, allowing female fitting 150 to provide greater support and stability for load bearing assembly 45 and to act as a wear surface.

Hot plate welding also allows for the depth of the weld to be modified so that fitting base 162 may be extended past the bottom surface 76 of stringer 75. This allows the wear surface height to be adjusted as desired to create either more or less wear surface. Additionally, because the fitting base 162 is in contact with the ground or support surface when a compressive load is placed on the support assembly 50, the load is transferred directly through block assembly 100 and not through stringer 75. These compressive forces are applied directly to the fitting base 162.

In other embodiments, other methods may be used to attach male fitting to deck 55 and to attach female fitting 150 to stringer 75. For example, injection molding, rotational molding, compression molding, blow molding, and thermoforming are all acceptable methods of attachment. Any other suitable method, such as the use of adhesive or fasteners may also be used. In some embodiments, different attachment methods may be use for attaching male fitting 110 to deck 55 and for attaching female fitting 150 to stringer 75. For example, male fitting 110 may be attached to deck 55 using a weld while female fitting 150 may be attached to stringer 75 using an adhesive.

FIGS. 15-16 show an alternative embodiment of a male fitting 210. Male fitting 210 is similar to male fitting 110 and includes a body 212 and projections 226 extending from the body 212. However, unlike male fitting 110, male fitting 210 does not include channels 136 on either side of projections 226. Instead, body 212 of male fitting 210 is free of voids surrounding projections 226.

Eliminating channels 136 strengthens projections 226, reducing the likelihood of projections 226 breaking during assembly or when a load is placed on deck 55 of the load bearing assembly 45, and increasing the amount of force needed to separate male fitting 210 from a female fitting 150. However, eliminating channels 136 also makes assembly of load bearing assembly 45 more difficult, as more force is necessary to deflect projections 226 inward or female fitting 150 needs to be deflected outward when male fitting 210 is inserted into female fitting 150.

Figure 17:
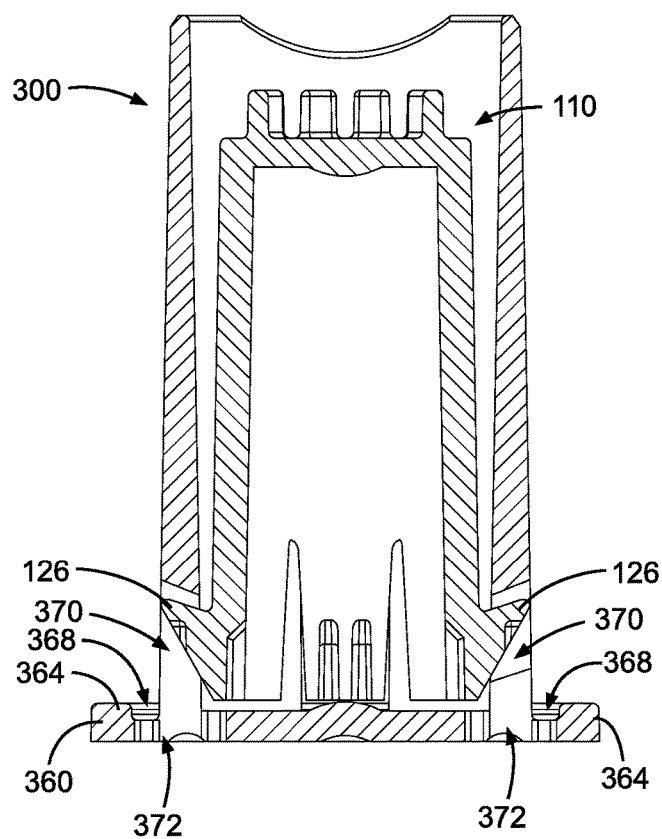
FIG. 17 is a cross-sectional front view of an alternative embodiment of a block assembly including a projection opening that forms a drainage point.
Figure 18:
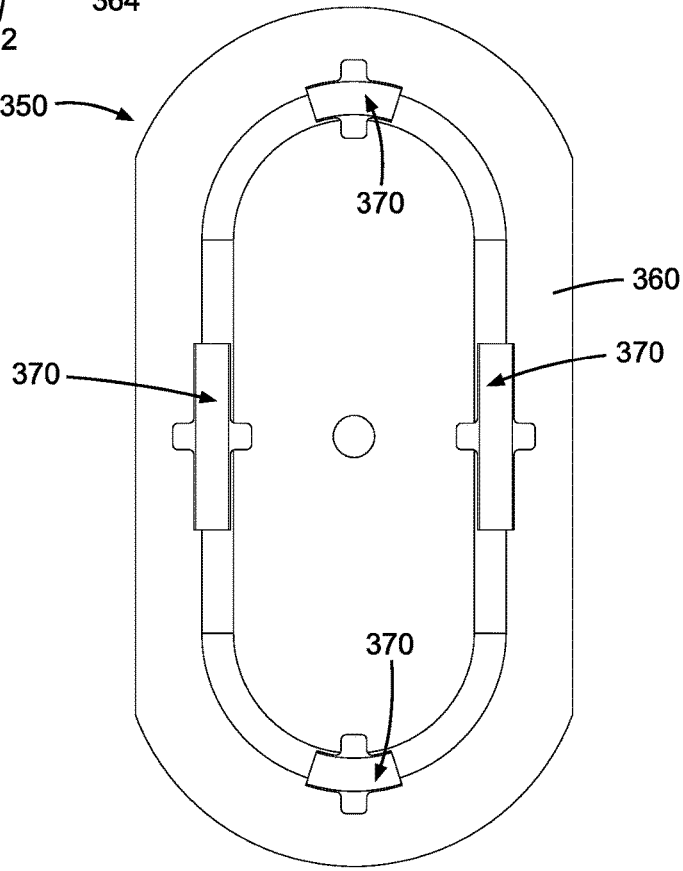
FIG. 18 is a bottom view of the block assembly of FIG. 17.

FIGS. 17-18 show an alternative embodiment of a female fitting 350. The projection opening 370 of female fitting 350 extends through the fitting base 360 at the base channel 368 to provide a drainage port. Therefore, any liquid that enters base channel 368 might be removed from fitting base 360 at the extended projection opening. As shown in FIG. 18, each of the projection openings 370 may extend through fitting base 360, providing multiple drainage points 372 formed in fitting base 360.

Figure 19:
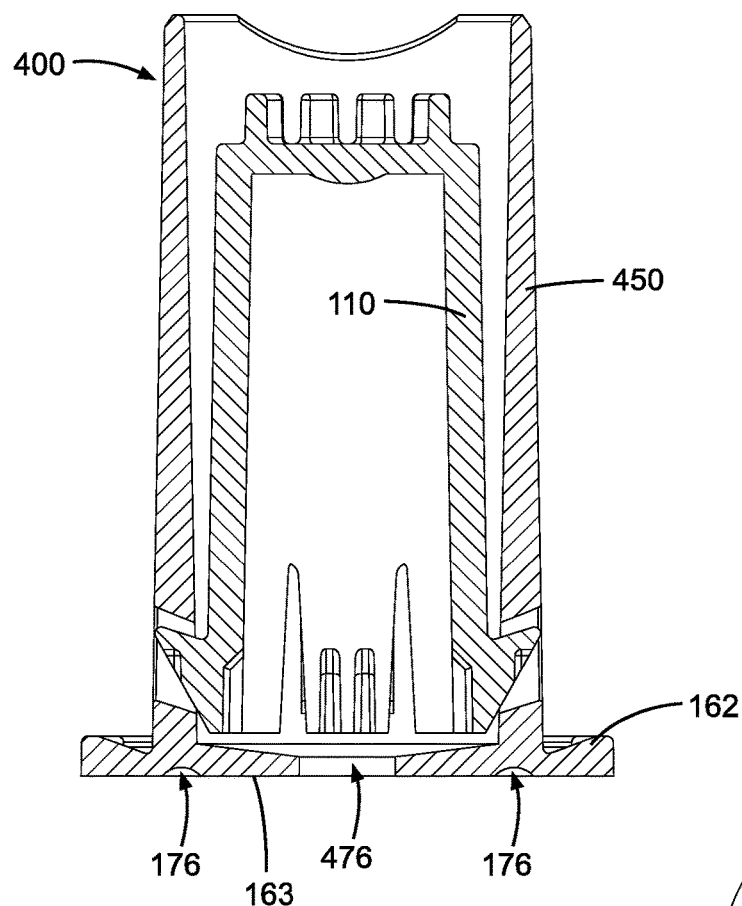
FIG. 19 is a cross-sectional front view of an alternative embodiment of a block assembly including a drainage port.
Figure 20:
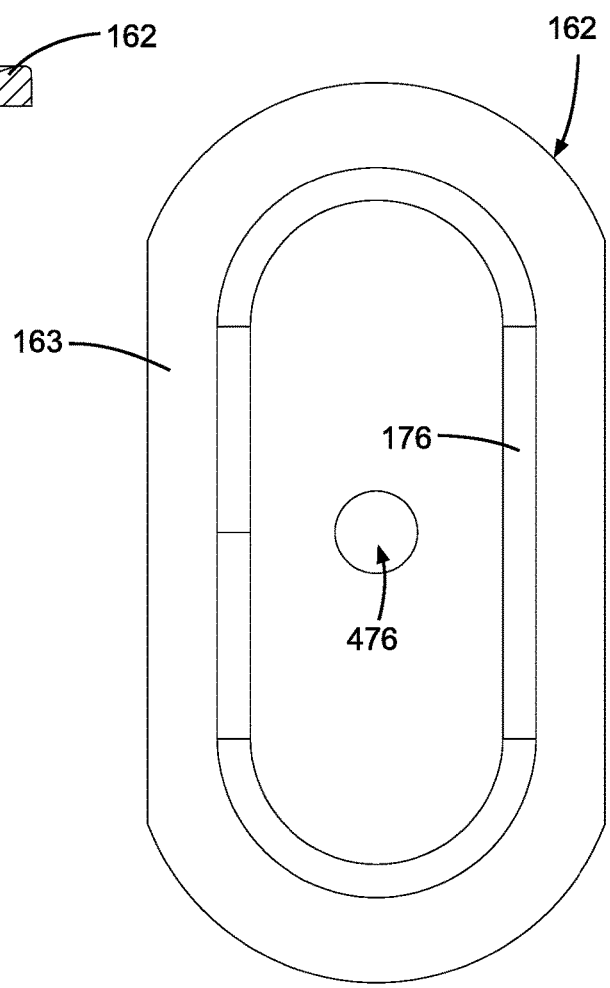
FIG. 20 is a bottom view of the block assembly of FIG. 19.

A block assembly 400 including another alternative embodiment of a female fitting 450 is shown in FIG. 19-20. Female fitting 450 includes a fitting base 162 that has a drainage port 476 that extends through the entire thickness of the fitting base 162. Drainage port 476 allows liquids trapped between male fitting 110 and female fitting 450 or trapped within the interior of male fitting 110 to be removed from block assembly 400. In addition to draining liquid, drainage port 476 can also be used as a point of access to the interior of male fitting 110 to insert or remove an RFID tag for tracking the location of the load bearing assembly 45. In the embodiment shown, the drainage port 476 is positioned in the center of fitting base 162. In other embodiments, drainage port 476 can be positioned at other locations through fitting base 162. In still other embodiments, female fitting 450 may include more than one drainage port 476.

Figure 21:
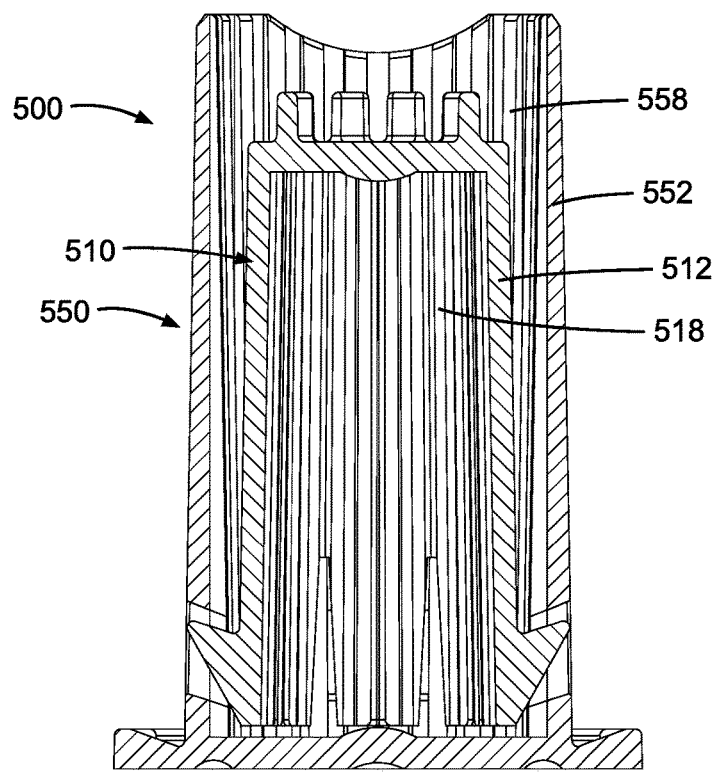
FIG. 21 is a cross-sectional front view of an alternative embodiment of a block assembly including internal ribs.

FIG. 21 illustrates an alternative embodiment of a block assembly 500. Block assembly includes a male fitting 510 including a male fitting body 512 and a female fitting 550 include a female fitting body 552. The interior of male fitting body 512 includes interior ribs 518 and the interior of female fitting body includes interior ribs 558. The interior ribs 518, 558 may increase the strength of the male fitting body 512 and/or female fitting body 552 while not greatly increasing the manufacturing time or the amount of material needed for male fitting 510 and female fitting 550.

In the embodiment shown, the entirety of the interior of male fitting body 512 and the entirety of female fitting body 552 include interior ribs 518, 558. However, in other embodiments, only a portion of the male fitting body 512 and the female fitting body 552 include ribs 518, 558. Additionally, in some embodiments, only the interior of male fitting body 512 includes interior ribs 518 while female fitting body 552 does not include ribs 558. In other embodiments, only the interior of female fitting body 552 includes ribs 558 while male fitting body 512 does not include interior ribs 518.

Figure 8:
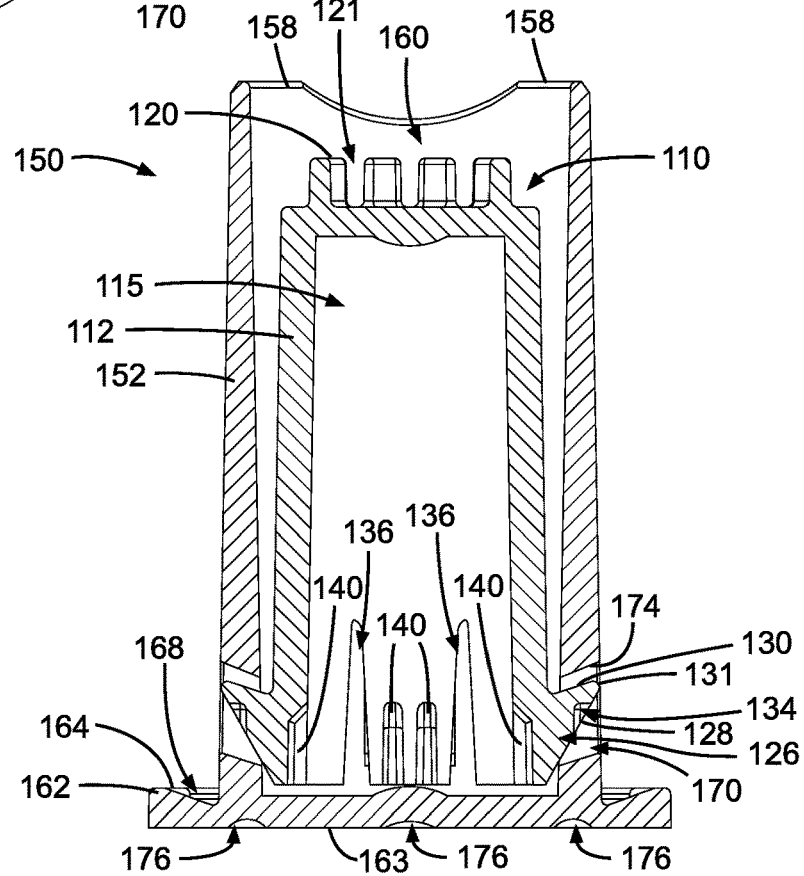
FIG. 8 is a cross-sectional front view of the block assembly of FIG. 7.
Figure 22:
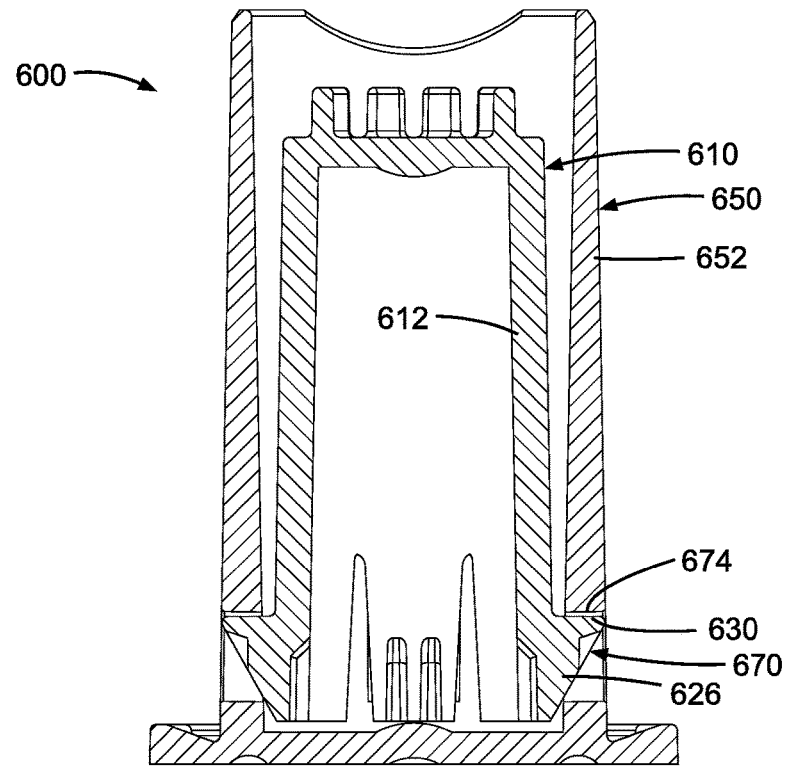
FIG. 22 is a cross-sectional front view of an alternative embodiment of a block assembly including a projection with a projection top surface that extends perpendicularly from a male fitting body.

FIG. 22 shows an alternative embodiment of a block assembly 600 that includes a male fitting 610 and a female fitting 650. Male fitting 610 includes a male fitting body 612 and a projection 626 with a projection top surface 630 that extends perpendicularly from male fitting body 612. Female fitting 650 includes a projection opening 670 defined through a female fitting body 652 that includes an upper surface 674. The upper surface 674 of projection opening 670 extends parallel to the projection top surface 630. The upper surface 674 and projection top surface 630 extend perpendicularly with respect to male fitting body 612 rather than at a concave angle as shown in FIG. 8. The perpendicular extension of projection top surface 630 reduces the clearance between the projection 626 and the upper surface 674 of the projection opening 670. The reduced clearance makes assembly of block assembly 600 easier as less force may be needed to insert projection 626 into projection opening 670. However, the reduced clearance also may decrease the strength of the connection between male fitting 610 from female fitting 650, making it easier to inadvertently remove male fitting 610 from female fitting 650

Figure 23:
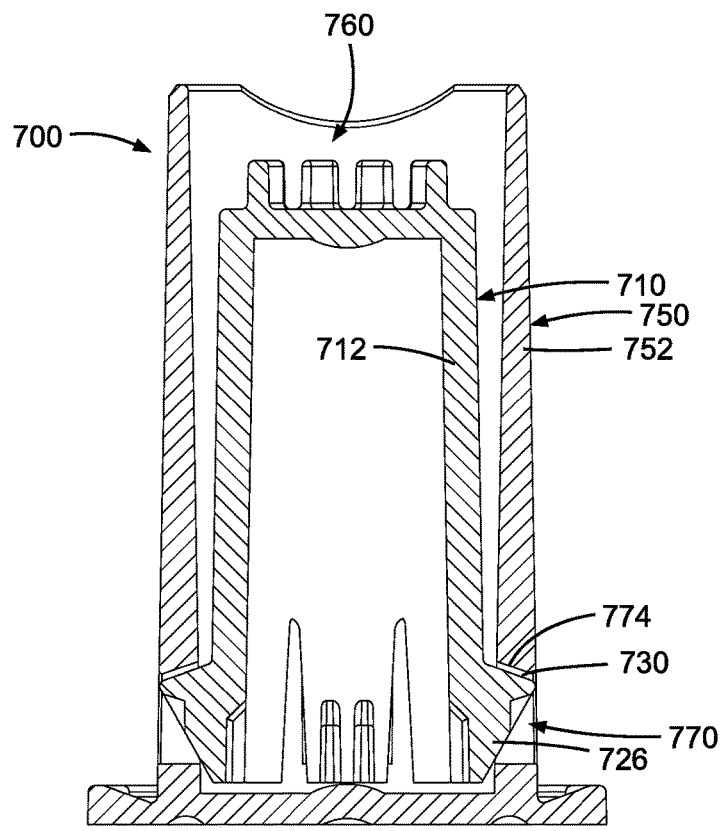
FIG. 23 is a cross-sectional front view of an alternative embodiment of a block assembly including a projection with a projection top surface that extends at a convex angle from a male fitting body.

FIG. 23 shows an alternative embodiment of a block assembly 700 that is similar to the block assembly 600 shown in FIG. 22. Block assembly 700 includes a male fitting 710 and a female fitting 750. Male fitting 710 includes a male fitting body 712 and a projection 726 with a projection top surface 730 that extends obliquely at a convex angle from male fitting body 712. Female fitting 750 includes a projection opening 770 defined through a female fitting body 752 that includes an upper surface 774. The upper surface 774 of projection opening 770 extends through female fitting body 752 at an angle parallel to the projection top surface 730.

The convex angle of projection top surface 730 may reduce the amount of deflection needed to fit projection 726 into projection opening 770. However, this can also reduce the strength of the connection between male fitting 710 and female fitting 750, making it easier to separate the support assembly 50 from the base assembly 70. As male fitting 710 is pulled away from female fitting 750, the upper surface 774 of projection opening 770 is allowed to move along projection top surface 730 to force projection top surface 730 inward, through projection opening 770 so that male fitting 710 may be removed from fitting cavity 760.

In some alternative embodiments, the exterior projection indents 134 and/or the interior projection indents 140 may be modified. For example, in some embodiments, the angled surfaces 128 may include no exterior projection indents 134 and no interior projection indents 140. Other embodiments may include exterior projection indents 134 but no interior projection indents 140 or may include interior projection indents 140 but no exterior projection indents 134.

Figure 24:
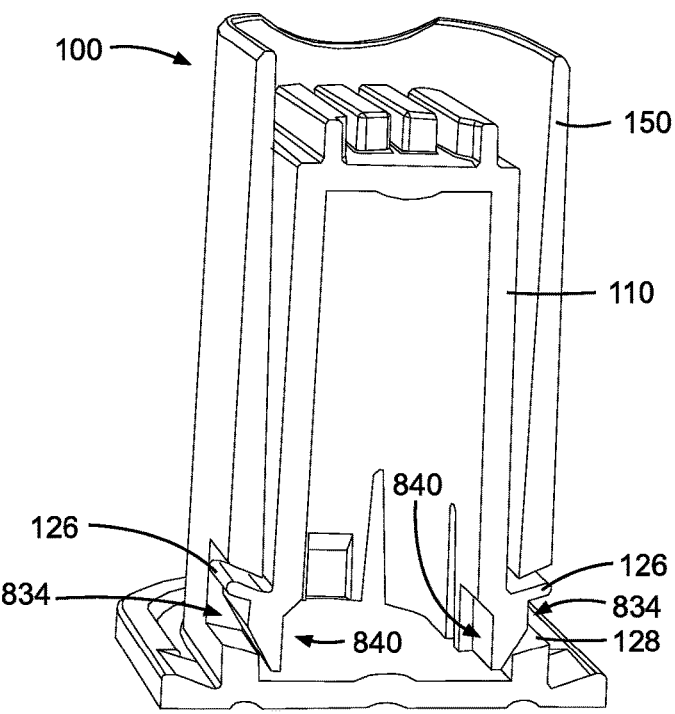
FIG. 24 is a cross-sectional perspective view of an alternative embodiment of a block assembly with an exterior projection indent.

In other embodiments, shown in FIG. 24, instead of including several small exterior projection indents 134 on angled surface 128, projections 126 may include a single exterior projection indent 834 that may extend the entire length or substantially the entire length of projection 126. Likewise, projections 126 may include a single interior projection indent 840 that extends the entire length or substantially the entire length of projection 126. The longer projection indents 834, 840 can reduce the amount of material needed to form male fitting 110 and can reduce the time needed to manufacture male fitting 110.

Figure 25:
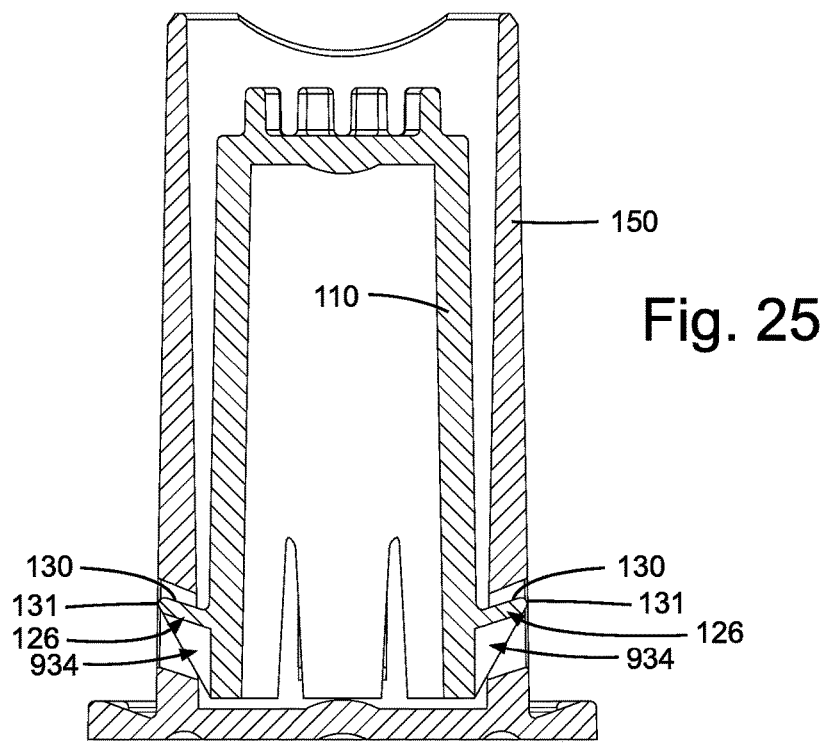
FIG. 25 is a cross-sectional front view of the block assembly of FIG. 24.

In another alternative embodiment, shown in FIG. 25, exterior projection indent 834 extends to the bottom surface of male fitting 110 so that angled surface 128 of projection 126 is removed. As shown in FIG. 25, embodiments including exterior projection indent 934 may not have an interior projection indent 140. However, in other embodiments, interior projection indents 140 may be included.

Figure 26:
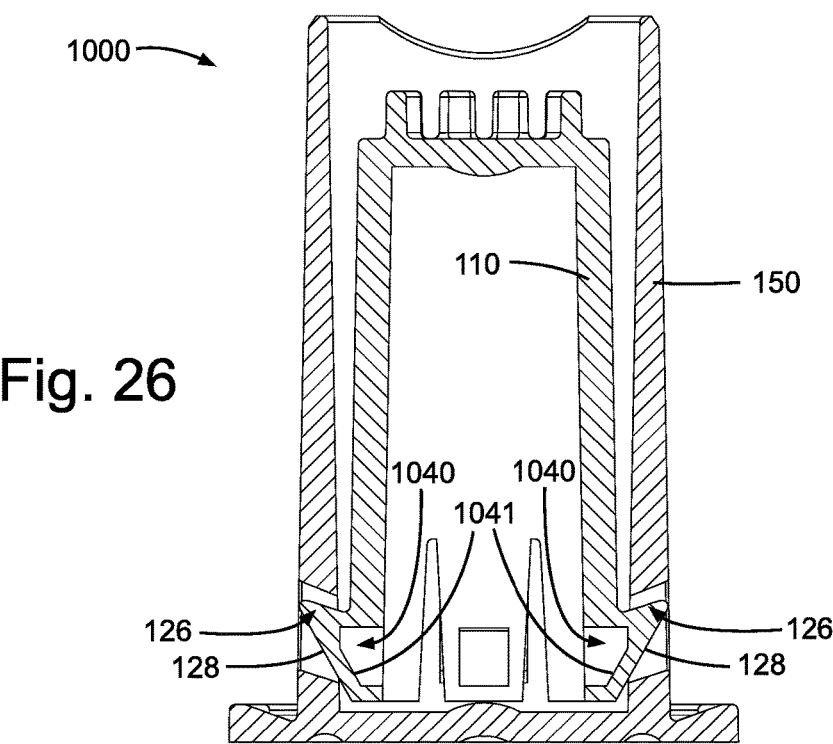
FIG. 26 is a cross-sectional perspective view of an alternative embodiment of a block assembly with an interior projection indent.

FIG. 26 shows an embodiment of a block assembly 1000 in which the exterior projection indent 134 has been removed from angled surface 128 and a single interior projection indent 1040 extends across substantially the entire length of projection 126. Interior projection indent 1040 includes an angled surface 1041 that is parallel or nearly parallel to angled surface 128 of projection 126.

Figure 27:
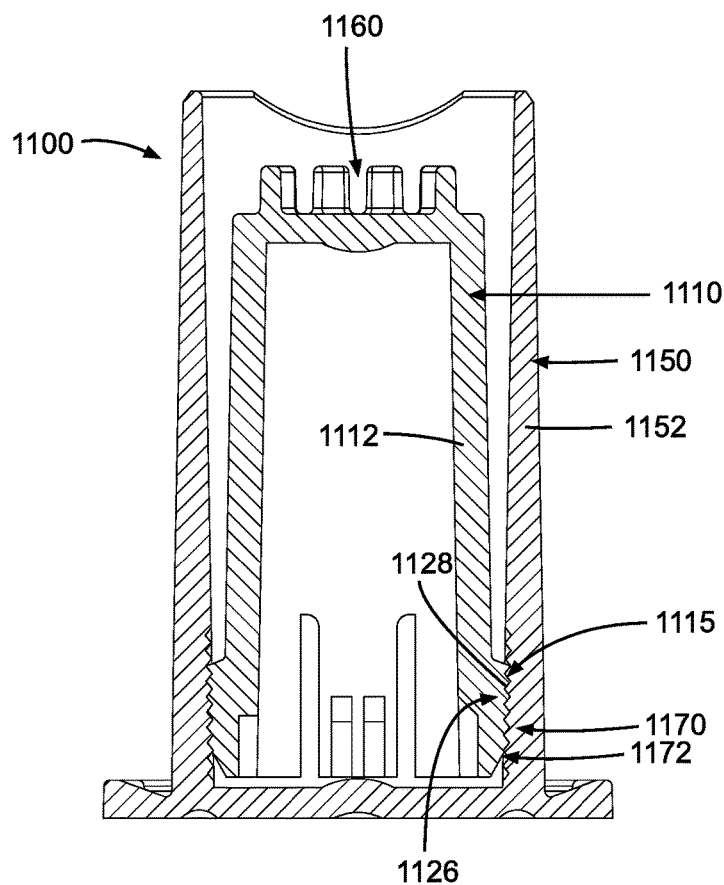
FIG. 27 is a cross-sectional perspective view of an alternative embodiment of a block assembly with an interlocking joint system.

FIG. 27 illustrates an embodiment of a block assembly 1100 that includes an alternative interlocking joint system 1115 to attach a male fitting 1110 and a female fitting 1150. The exterior of the male fitting body 1112 includes a male fitting joint 1126 that is composed of a series of joint protrusions 1128. The interior surface of the female fitting body 1152 includes a female fitting joint 1170 that includes a series of joint depressions 1172 that correspond to the joint protrusions 1128.

Male fitting 1110 is inserted into the fitting cavity 1160 of female fitting 1150 until a joint protrusion 1128 is inserted into a joint depression 1172. Applying force on male fitting 1110 forces the joint protrusions 1128 into each subsequent joint depression 1172. Once male fitting 1110 has been inserted into fitting cavity 1160 as far as desired, the force is removed from male fitting 1110 and the joint protrusions 1128 rest in a corresponding joint depression 1172. The interaction between joint protrusion 1128 and joint depression 1172 may prevent male fitting 1110 from being removed from female fitting 1150 until sufficient force is applied to male fitting 1110 to remove the joint protrusion 1128 from the joint depression 1172.

Figure 28:
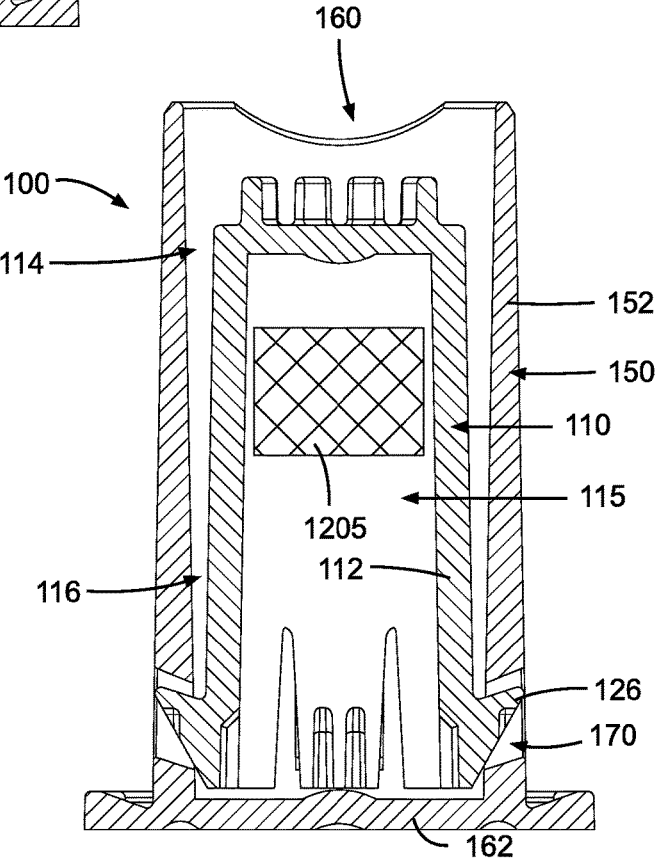
FIG. 28 is a cross-sectional perspective view of an alternative embodiment of a block assembly with a limit stop.
Figure 29:
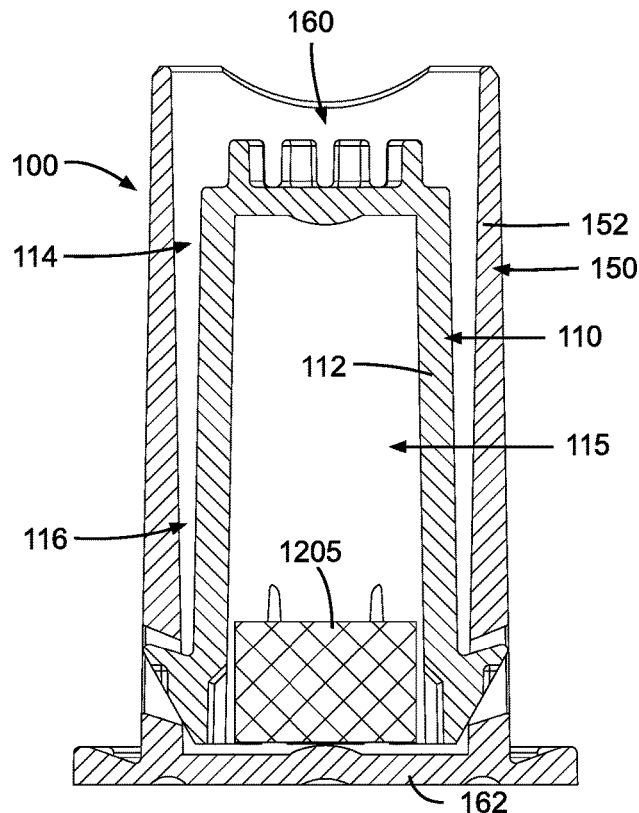
FIG. 29 is a cross-sectional perspective view of block assembly of FIG. 28 with the limit stop in an engaged position.

In some embodiments, as illustrated in FIGS. 28-29, block assembly 100 includes a limit stop 1205. The limit stop 1205 is inserted within the male fitting interior 115. When male fitting 110 is inserted into female fitting 150, the limit stop 1205 may be positioned in a disengaged position in the top portion 114 of male fitting 110 so that limit stop 1205 does not interfere with the deflection of projections 126 (see FIG. 28). As an example, limit stop 1205 may be moved to the disengaged position by turning male fitting 110 upside down, allowing gravity to move limit stop 1205 to the disengaged position in the top portion 114 of male fitting 110. In other embodiments, any other suitable method may be used to move limit stop 1205 to the disengaged position.

After male fitting 110 is inserted to the desired position within interior cavity 160 of female fitting 150, limit stop 1205 may be moved to an engaged position in the bottom portion 116 of male fitting 110 (see FIG. 29). In some embodiments, limit stop 1205 may be moved from the disengaged position to the engaged position using gravity by turning male fitting 110 and female fitting 150 to an upright position. In other embodiments, other suitable methods of moving limit stop 1205 may be used.

In the engaged position, limit stop 1205 is positioned adjacent to projections 126 and may be used to prevent deflection of the projections 126 into the male fitting interior 115. This increases the resistance to projections 126 being removed from projection openings 170 so that it is unlikely for male fitting 110 to be inadvertently removed from female fitting 150 when limit stop 1205 is in the engaged position. In order to remove male fitting 110 from female fitting 150, limit stop 1205 is moved from the engaged position back to the disengaged position, shown in FIG. 28.

In some embodiments, limit stop 1205 may be used with a female fitting 150 that includes a drainage port 476 like the embodiment shown in FIG. 19. This combination of features allows the limit stop 1205 to be held in place during assembly by holding the limit stop 1205 through the drainage port 476. The limit stop 1205 may include an opening aligned with the drainage port 476 to allow liquid from the male fitting interior 115 to drain through the limit stop 1205 and through the drainage port 476.

Figure 30:
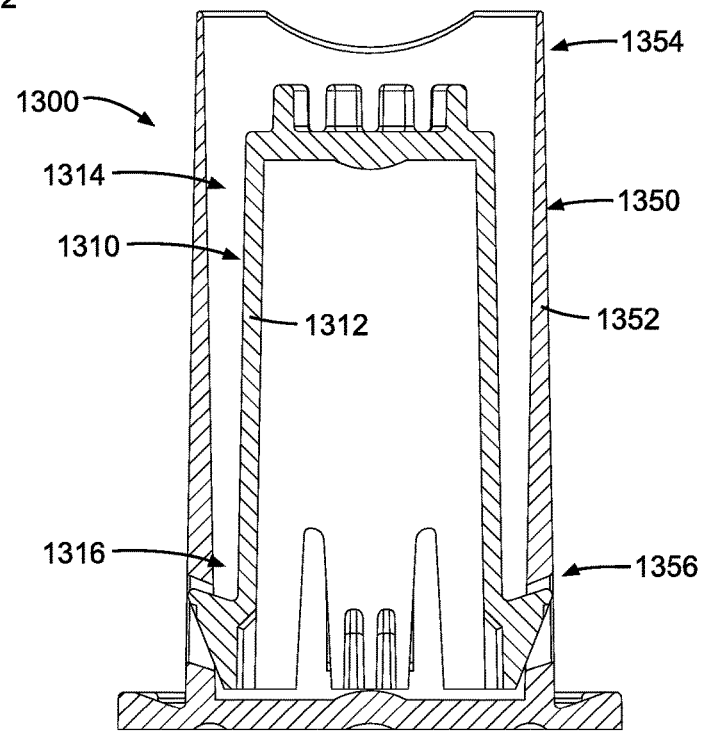
FIG. 30 is a cross-sectional perspective view of an alternative embodiment of a block assembly with a tapered female fitting body.

An alternative embodiment of block assembly 1300, shown in FIG. 30, includes a female fitting 1350 that includes a female fitting body 1352 that has a tapered wall thickness. The thickness of the bottom portion 1356 of female fitting body 1352 is greater than the thickness of the top portion 1354 of female fitting body 1352. This arrangement may provide strength to the bottom portion 1356 of female fitting body 1352 while also reducing the amount of material and the cost needed to produce female fitting 1350.

In other embodiments, female fitting body 1352 may be tapered so that the bottom portion 1356 of female fitting body 1352 is thinner than the top portion 1354 of female fitting body 1352. In some embodiments, the wall thickness of male fitting body 1312 may also be varied or tapered, so that the top portion 1314 of male fitting 1310 is thinner than the bottom portion 1316 of male fitting 1310 or so that the top portion 1314 of male fitting 1310 is thicker than the bottom portion 1316 of male fitting 1310.

Figure 31:
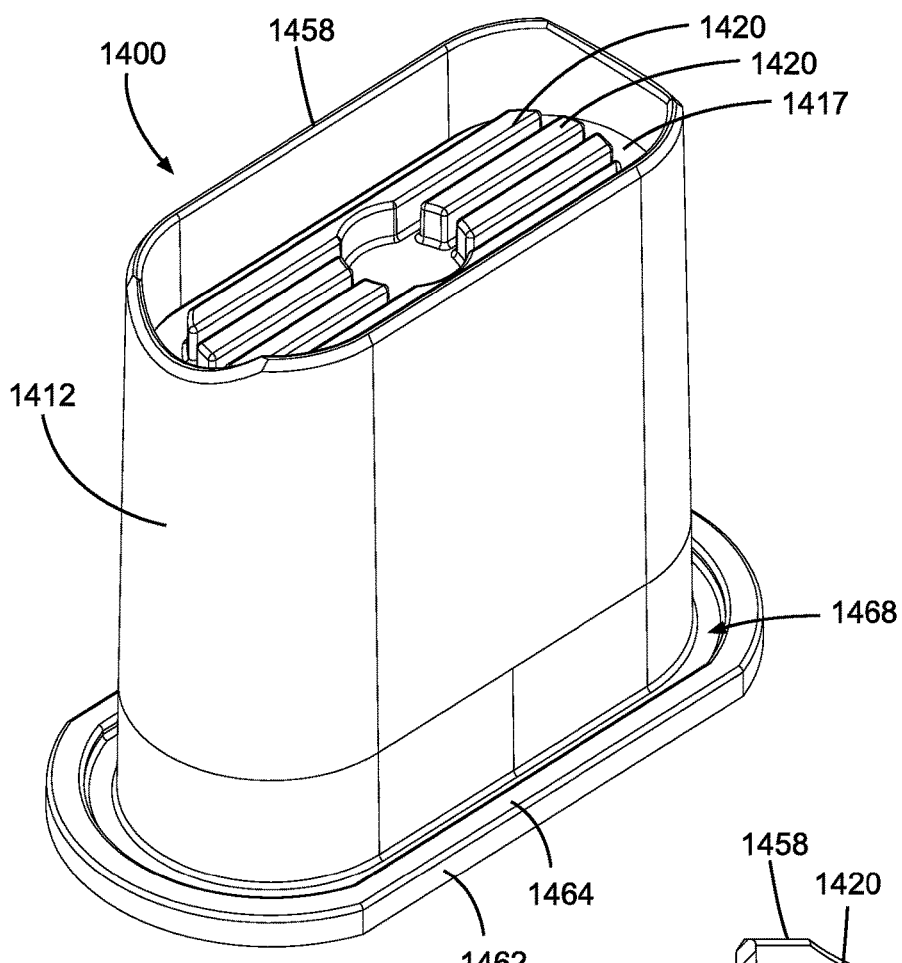
FIG. 31 is a perspective view of an alternative embodiment of a block assembly made from a single part.
Figure 32:
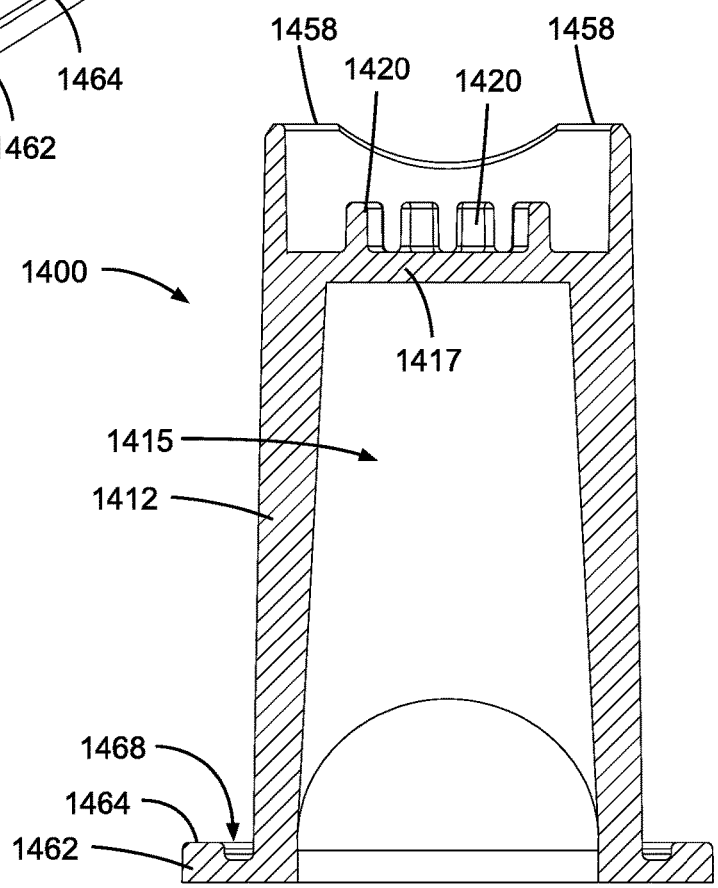
FIG. 32 is a cross-sectional front view of the block assembly of FIG. 31.

FIGS. 31-32 show an embodiment of a block assembly 1400 that is made from a unitary piece rather than comprising a separate male fitting 110 and female fitting 150. Block assembly 100 has a single fitting body 1412 that defines an interior cavity 1415. Fitting body 1412 extends between an upper lip 1458 and a fitting base 1462. Fitting base 1462 includes a lip 1464 and a base channel 1468 positioned between lip 1464 and fitting body 1412. Lip 1464 may serve as an attachment point for attaching block assembly 1400 to a stringer 75.

One or more flanges 1420 extends from an upper surface 1417 of fitting body 1412 and are surrounded by upper lip 1458. Flanges 1420 may be used as an attachment point for attaching block assembly 1400 to a deck 55. Upper lip 1458 may be arranged to fit within a fitting attachment channel 64 (see FIG. 14) in deck 55 when flanges 1420 are attached to deck 55.

The single part block assembly 1400 provides an option that has greater simplicity and fewer pieces than the two part design of block assembly 100. However, the two part block assembly 100 can offer greater customizability and typically has greater strength than the single part block assembly 1400. The single part block assembly 1400 may use less material than two part block assembly 100, and may require fewer steps for production as well as assembly of the load bearing assembly 45. In some cases, the single part block assembly 1400 may weigh less and cost loss to product than the two part block assembly 100. Therefore, choosing between the single part block assembly 1400 and the two part block assembly 100 depends upon weighing the benefit of cost savings and increasing strength of the load bearing assembly 45. In some applications where the load bearing assembly 45 is to be used in situations where additional strength is not needed, the cost savings of the single part block assembly 1400 may be desired. In situations where strength of the load bearing assembly 45 is the main concern, the two part block assembly 100 may be desired.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:

1. A block assembly for connecting a first section to a second section of a load bearing assembly, wherein the first section includes a fitting attachment section including a first section flange and a fitting attachment channel, and wherein the second section includes a cavity surrounding a second section opening and a cavity lip positioned within the cavity, the block assembly comprising:
   a male fitting comprising:
      a male fitting body including a top portion and a bottom portion;
      a male fitting flange attached to said top portion of said male fitting body, wherein said male fitting flange is attachable to the first section flange to attach said male fitting to the first section of the load bearing assembly;
      a projection extending from said male fitting body;
   a female fitting comprising:
      a female fitting body including an upper portion and a lower portion and defining a fitting cavity extending within an interior of the female fitting;
      an interlocking joint defined in said female fitting body;
      a fitting base attached to the lower portion of said female fitting body, said fitting base including a female fitting lip;
      wherein said female fitting is configured to fit into the second section opening and wherein said female fitting lip is attachable to the cavity lip to attach said female fitting to the second section of the load bearing assembly;
   wherein said male fitting is configured to couple with said female fitting by inserting said male fitting body within said fitting cavity and moving said male fitting body toward the fitting base of the female fitting;
   wherein said projection interacts with the interlocking joint on said female fitting to resist detachment of said male fitting with respect to said female fitting; and
   wherein the upper portion of said female fitting body is configured to fit within the fitting attachment channel of the first section of the load bearing assembly when the first section and the second section are connected.

2. The block assembly of claim 1, wherein said female fitting includes a projection opening defined through at least a portion of said female fitting body.

3. The block assembly of claim 2, wherein when said projection is received in said projection opening, said projection and said projection opening interact to resist movement of said male fitting with respect to said female fitting.

4. The block assembly of claim 2,
   wherein said projection includes an angled surface connected to a projection top surface at a projection edge;
   wherein said projection opening is surrounded by a projection opening inner surface that includes a projection opening top surface; and,
   wherein said projection top surface is parallel to said projection opening top surface when said projection is received within said projection opening.

5. The block assembly of claim 2, wherein said projection opening extends through said fitting base of said female fitting body.

6. The block assembly of claim 1, wherein the female fitting is configured to fit into the second section opening so that the female fitting extends completely through the second section of the load bearing assembly.

7. The block assembly of claim 1, wherein said male fitting includes a channel defined through said male fitting body and positioned adjacent to said projection, and wherein said channel of the male fitting is configured to allow deflection of said projection into an interior of said male fitting upon application of force to said projection.

8. The block assembly of claim 1, wherein said male fitting includes two male fitting flanges and a male fitting flange groove defined between said male fitting flanges, wherein said male fitting flange groove aligns with the fitting attachment channel when said male fitting flanges are aligned with the first section flange, and wherein plastic is able to flow through said male fitting flange groove when said male fitting is welded to the first section.

9. The block assembly of claim 1, wherein said fitting base includes a base channel positioned between said female fitting lip and said female fitting body, and wherein plastic is able to flow through said base channel when said female fitting is welded to the second section.

10. The block assembly of claim 1, wherein said fitting base is made from a material that is resistant to wear compared to the second section of the load bearing assembly.

11. The block assembly of claim 1, wherein an interior surface of said male fitting includes internal ribs and wherein said interior of said female fitting includes internal ribs.

12. The block assembly of claim 1, further comprising:
a limit stop positioned within said fitting cavity; and,
wherein said limit stop is configured to interact with said male fitting when said male fitting is inserted into said fitting cavity to provide additional resistance to prevent removal of the male fitting from said fitting cavity.

13. The block assembly of claim 1, further comprising:
a drainage port extending through said fitting base, wherein said drainage port is configured to allow liquid to drain from said fitting cavity.

14. The block assembly of claim 1, wherein said male fitting is configured to be attached to a deck of a pallet assembly, and wherein said female fitting is configured to be attached to a stringer of the pallet assembly.

15. The block assembly of claim 1, wherein said projection extends from said male fitting body at a concave angle.

16. The block assembly of claim 1, wherein said projection extends perpendicularly from said male fitting body.

17. The block assembly of claim 1, wherein said projection extends from said male fitting body at a convex angle.

18. A method of forming a load bearing assembly including a first section and a second section and the block assembly of claim 1, comprising:
attaching said male fitting to the first section of the load bearing assembly;
attaching said female fitting to the second section of the load bearing assembly;
inserting the male fitting into said fitting cavity defined in said female fitting;
applying force to move said male fitting within said fitting cavity until said male fitting is positioned within fitting cavity so that said projection interacts with the interlocking joint defined in said female fitting body; and
wherein when said projection interacts with said interlocking joint, said male fitting resists detachment from said female fitting to attach the first section of the load bearing assembly to the second section of the load bearing assembly.

19. A method of forming a load bearing assembly including a first section and a second section, comprising:
attaching a male fitting to the first section of the load bearing assembly, wherein said male fitting includes a male fitting body and a projection extending from said male fitting body;
attaching a female fitting to the second section of the load bearing assembly, wherein said female fitting includes a female fitting body defining a fitting cavity extending within an interior of the female fitting and one or more projection openings defined extending into said female fitting body;
inserting the male fitting into said fitting cavity defined in said female fitting;
applying force to move said male fitting within said fitting cavity until said male fitting is positioned within said fitting cavity so that said projection is received in said projection opening in said female fitting; and
wherein when said projection is received in said projection opening of said female fitting, said projection member and said projection opening resist detachment of said male fitting from said female fitting to attach the first section of the load bearing assembly to the second section of the load bearing assembly.

20. The method of claim 19, further comprising:
welding the male fitting to the first section of the load bearing assembly by hot plate welding; and
welding the female fitting to the second section of the load bearing assembly by hot plate welding.

* * * * *